INVENTOR.
ROBERT G. FRIEDMAN
BY
RICHEY, McNENNY & FARRINGTON
ATTORNEYS

Jan. 7, 1964　　　　　R. G. FRIEDMAN　　　　　3,116,499
MACHINE FOR MAKING BOLTS
Filed Oct. 30, 1958　　　　　　　　　　　　　　　22 Sheets-Sheet 3

INVENTOR.
ROBERT G. FRIEDMAN
BY
RICHEY, McNENNY & FARRINGTON
ATTORNEYS

Jan. 7, 1964        R. G. FRIEDMAN        3,116,499
MACHINE FOR MAKING BOLTS
Filed Oct. 30, 1958        22 Sheets-Sheet 4

INVENTOR.
ROBERT G. FRIEDMAN
BY
RICHEY, McNENNY & FARRINGTON
ATTORNEYS

INVENTOR.
ROBERT G. FRIEDMAN
BY
RICHEY, McNENNY & FARRINGTON
ATTORNEYS

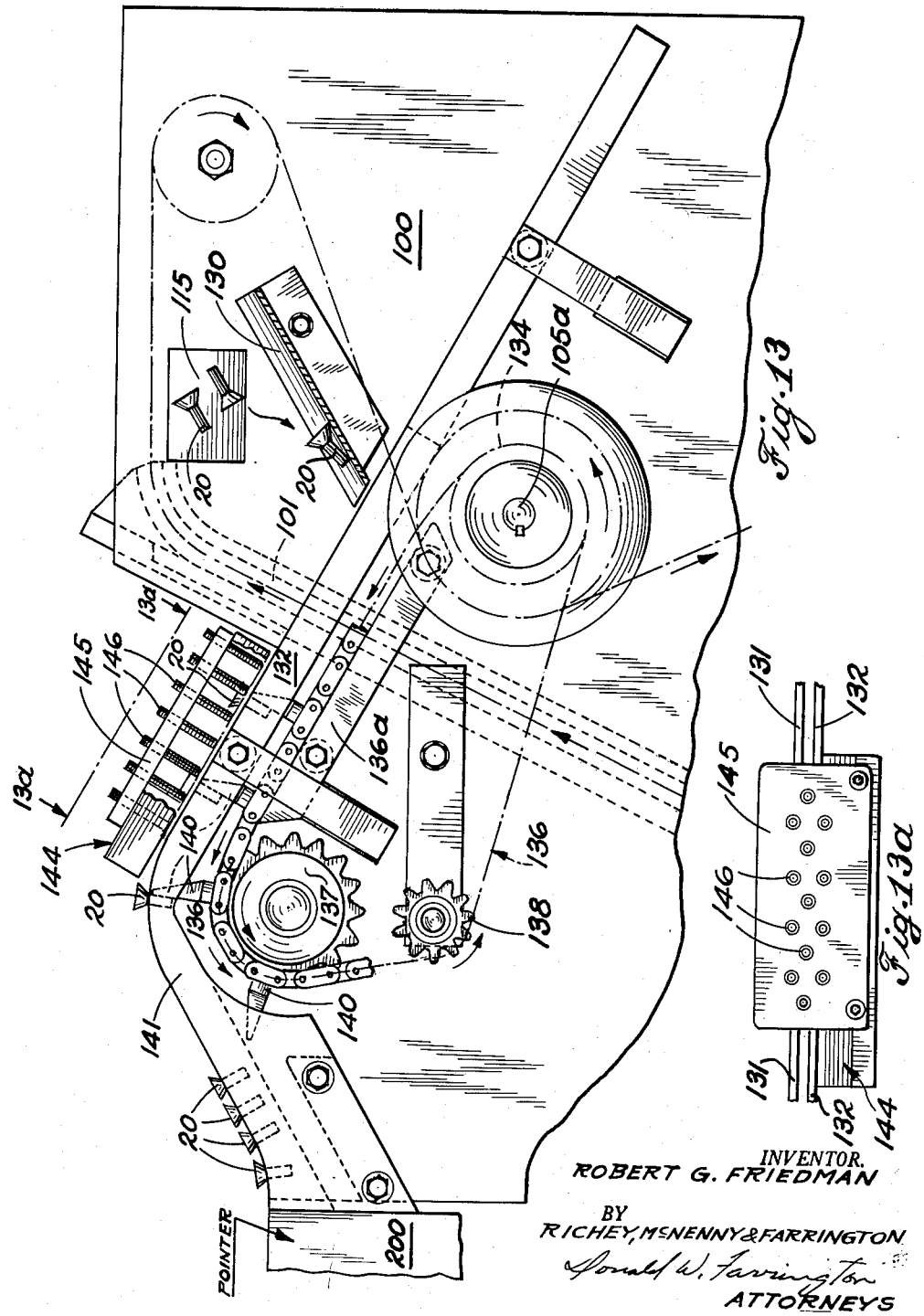

Jan. 7, 1964  R. G. FRIEDMAN  3,116,499
MACHINE FOR MAKING BOLTS
Filed Oct. 30, 1958  22 Sheets-Sheet 7
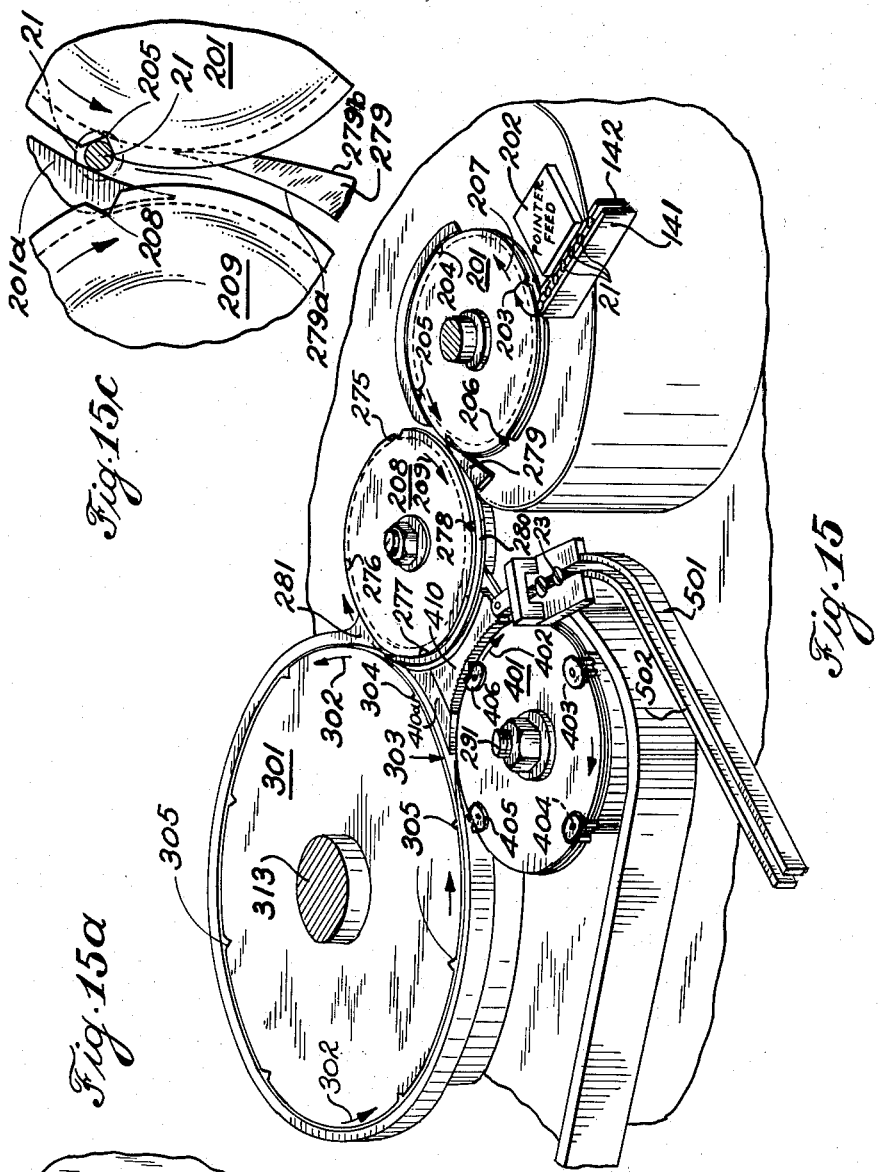
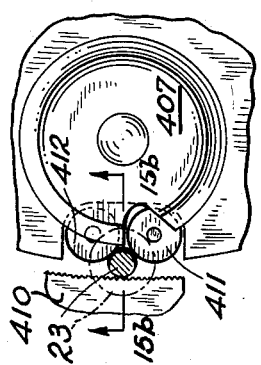
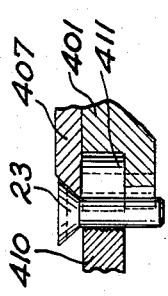
INVENTOR.
ROBERT G. FRIEDMAN
BY RICHEY, McNENNY & FARRINGTON
ATTORNEYS

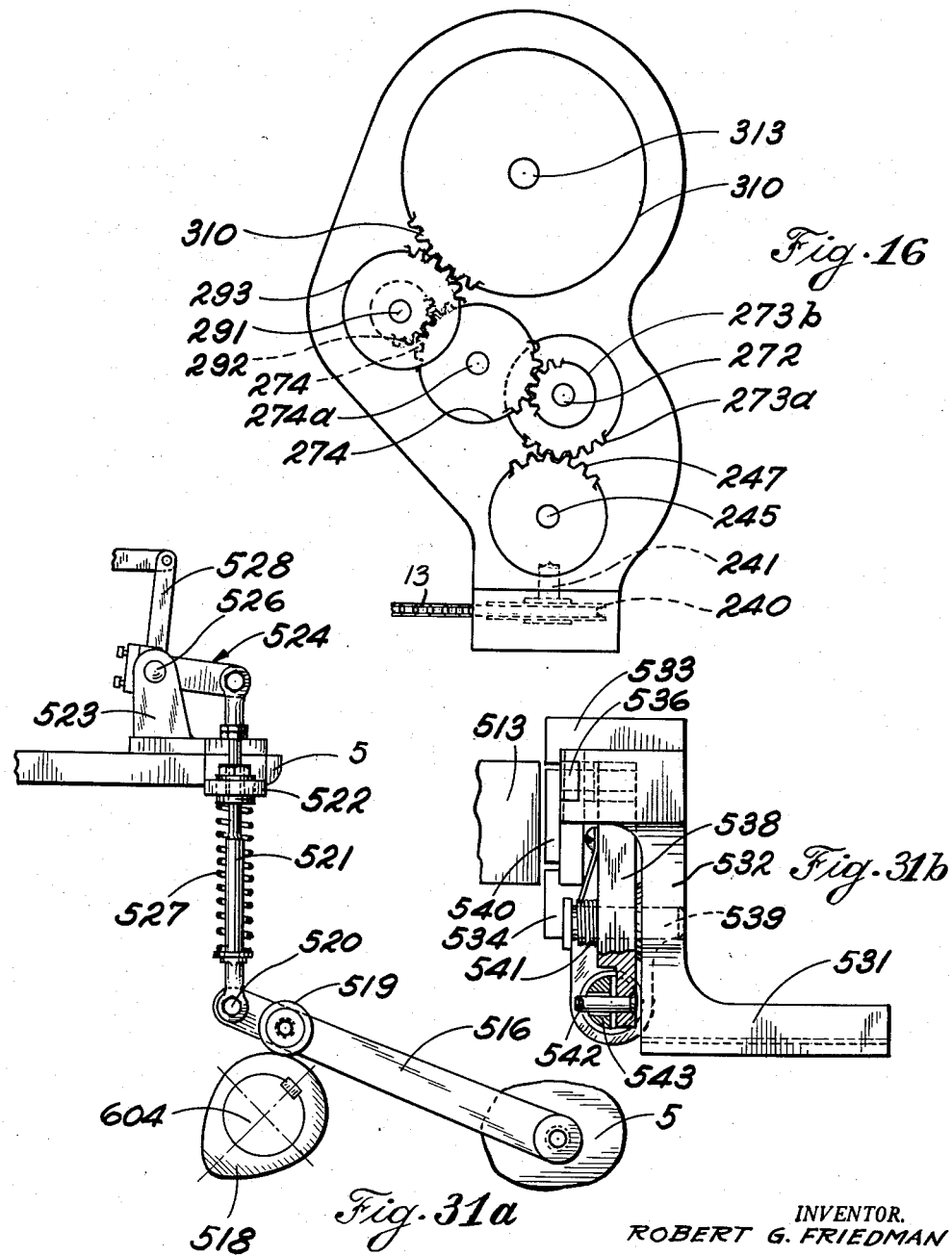

Jan. 7, 1964    R. G. FRIEDMAN    3,116,499
MACHINE FOR MAKING BOLTS
Filed Oct. 30, 1958    22 Sheets-Sheet 9

INVENTOR.
ROBERT G. FRIEDMAN
BY
RICHEY, McNENNY & FARRINGTON
ATTORNEYS

Jan. 7, 1964 R. G. FRIEDMAN 3,116,499
MACHINE FOR MAKING BOLTS
Filed Oct. 30, 1958 22 Sheets-Sheet 11

INVENTOR.
ROBERT G. FRIEDMAN
BY
RICHEY, McNENNY & FARRINGTON
ATTORNEYS

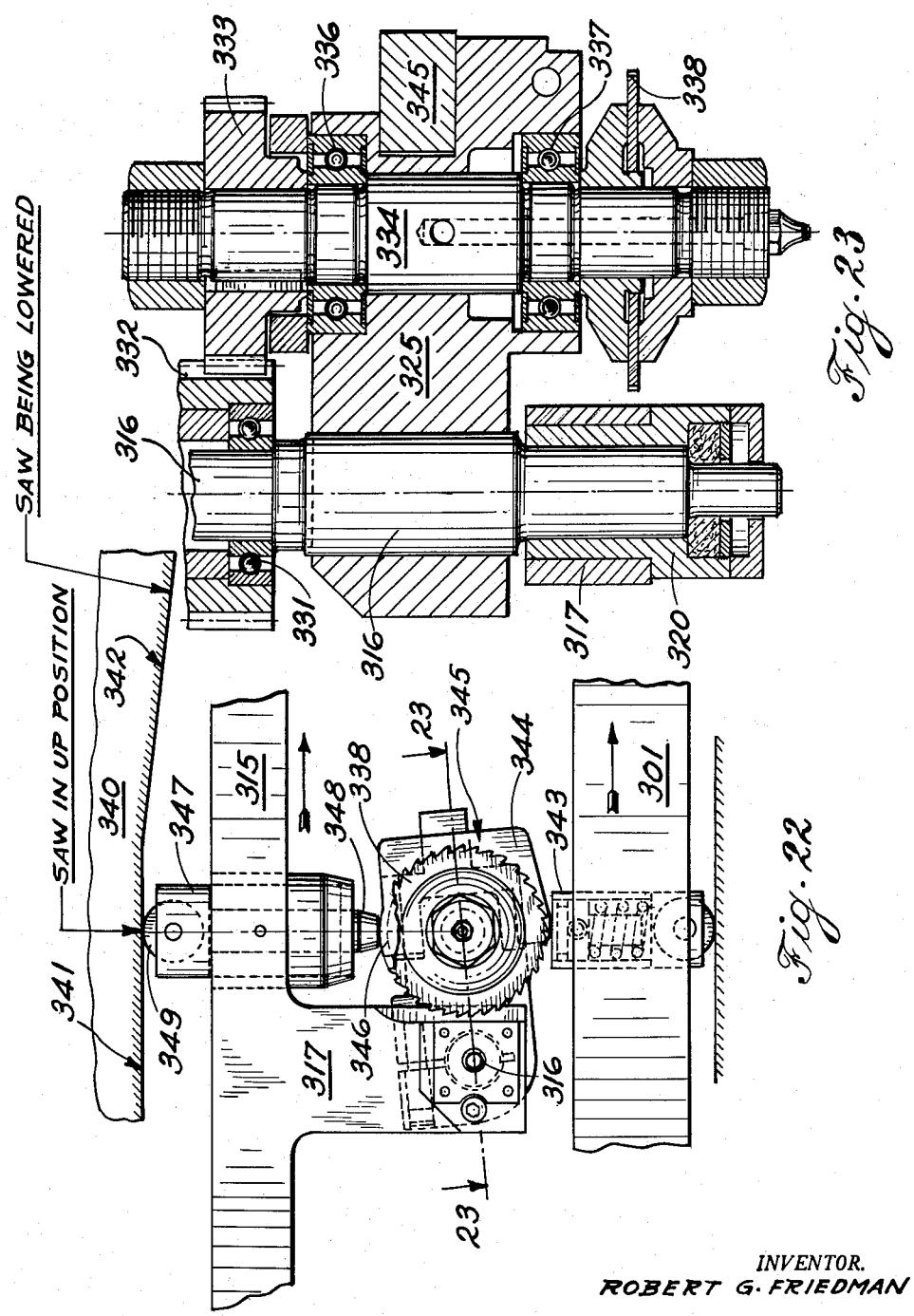

Jan. 7, 1964 R. G. FRIEDMAN 3,116,499
MACHINE FOR MAKING BOLTS
Filed Oct. 30, 1958 22 Sheets-Sheet 13

INVENTOR.
ROBERT G. FRIEDMAN
BY
RICHEY, M<sup>c</sup>NENNY & FARRINGTON
ATTORNEYS Jan. 7, 1964   R. G. FRIEDMAN   3,116,499
MACHINE FOR MAKING BOLTS
Filed Oct. 30, 1958   22 Sheets-Sheet 14

INVENTOR.
ROBERT G. FRIEDMAN
BY
RICHEY, McNENNY & FARRINGTON
ATTORNEYS

Jan. 7, 1964        R. G. FRIEDMAN         3,116,499
            MACHINE FOR MAKING BOLTS
Filed Oct. 30, 1958                 22 Sheets-Sheet 15
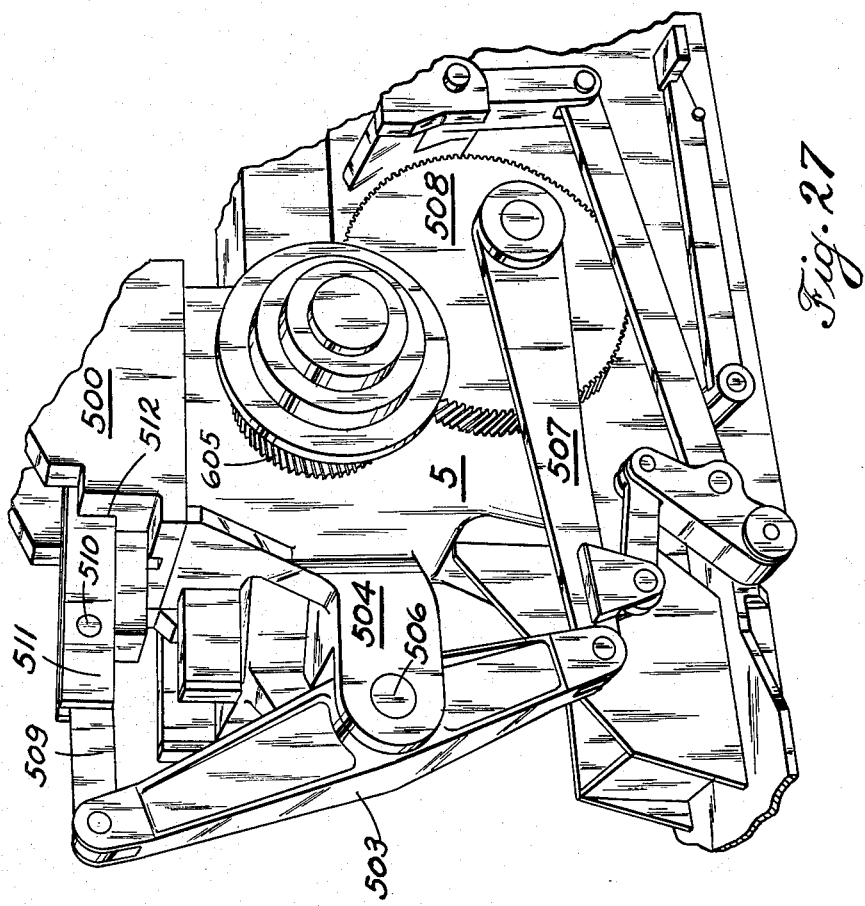
INVENTOR.
ROBERT G. FRIEDMAN
BY
RICHEY, McNENNY & FARRINGTON
ATTORNEYS

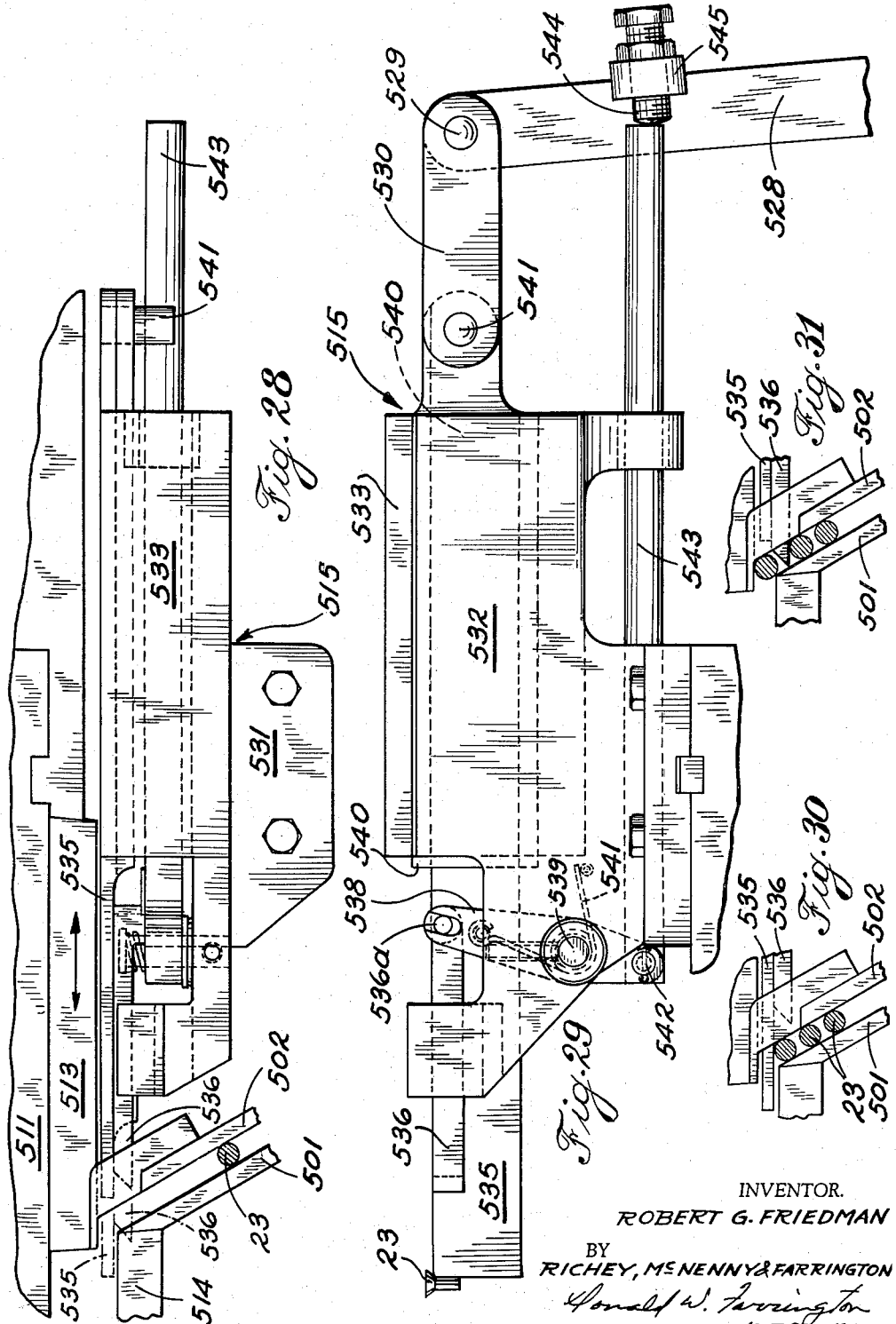

Jan. 7, 1964   R. G. FRIEDMAN   3,116,499
MACHINE FOR MAKING BOLTS
Filed Oct. 30, 1958   22 Sheets-Sheet 17
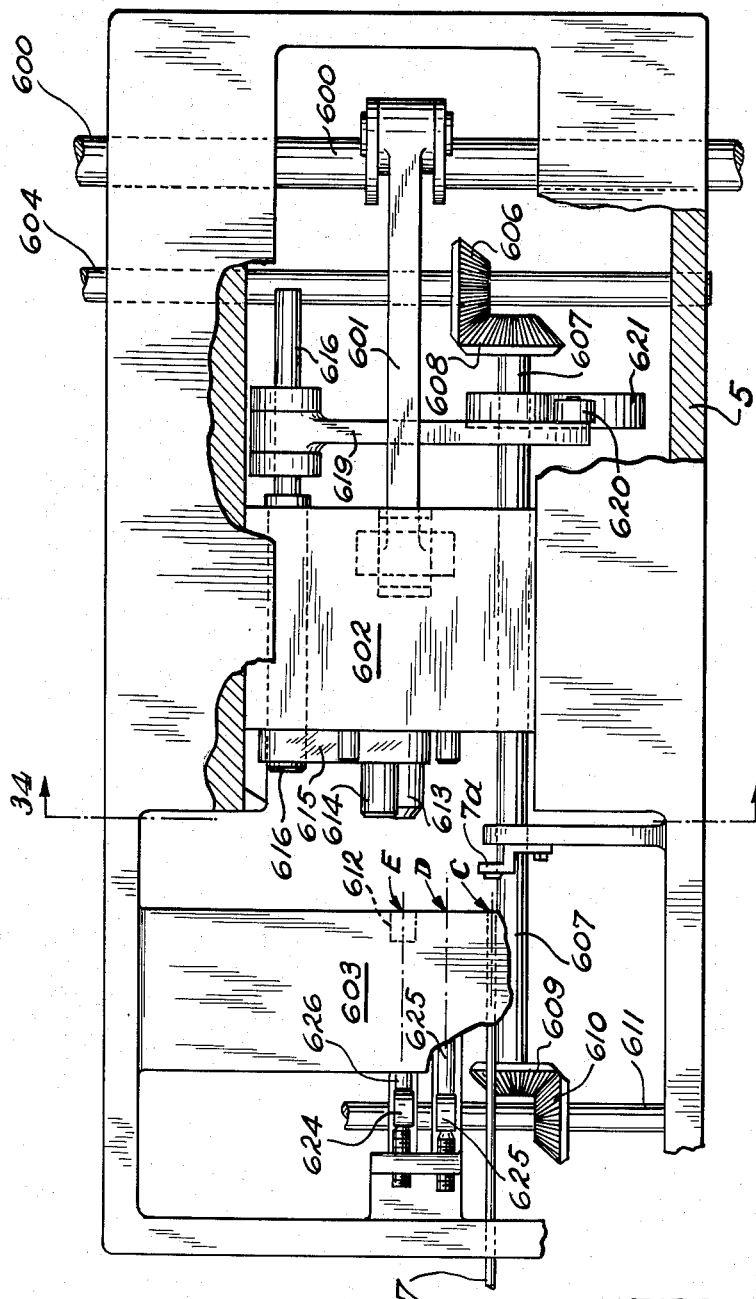
INVENTOR.
ROBERT G. FRIEDMAN
BY
RICHEY, McNENNY & FARRINGTON
Donald W. Farrington
ATTORNEYS

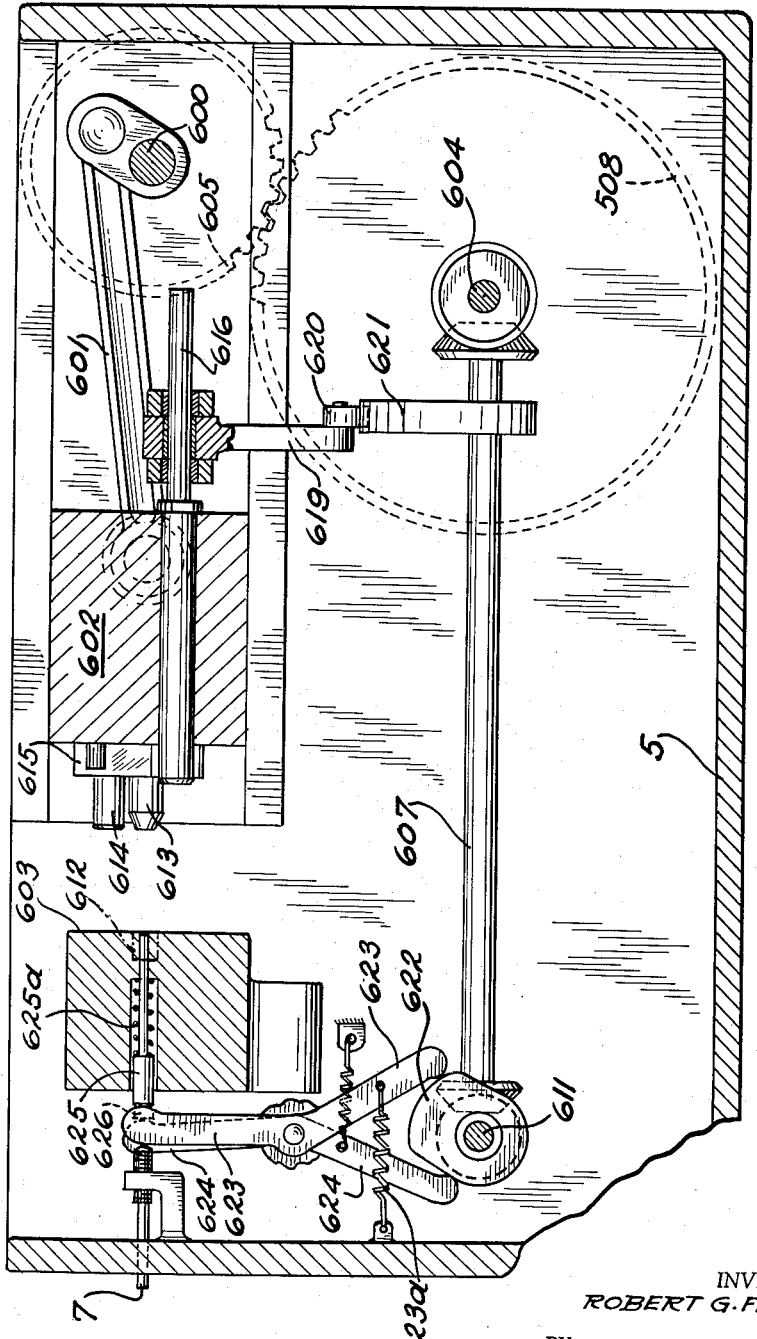

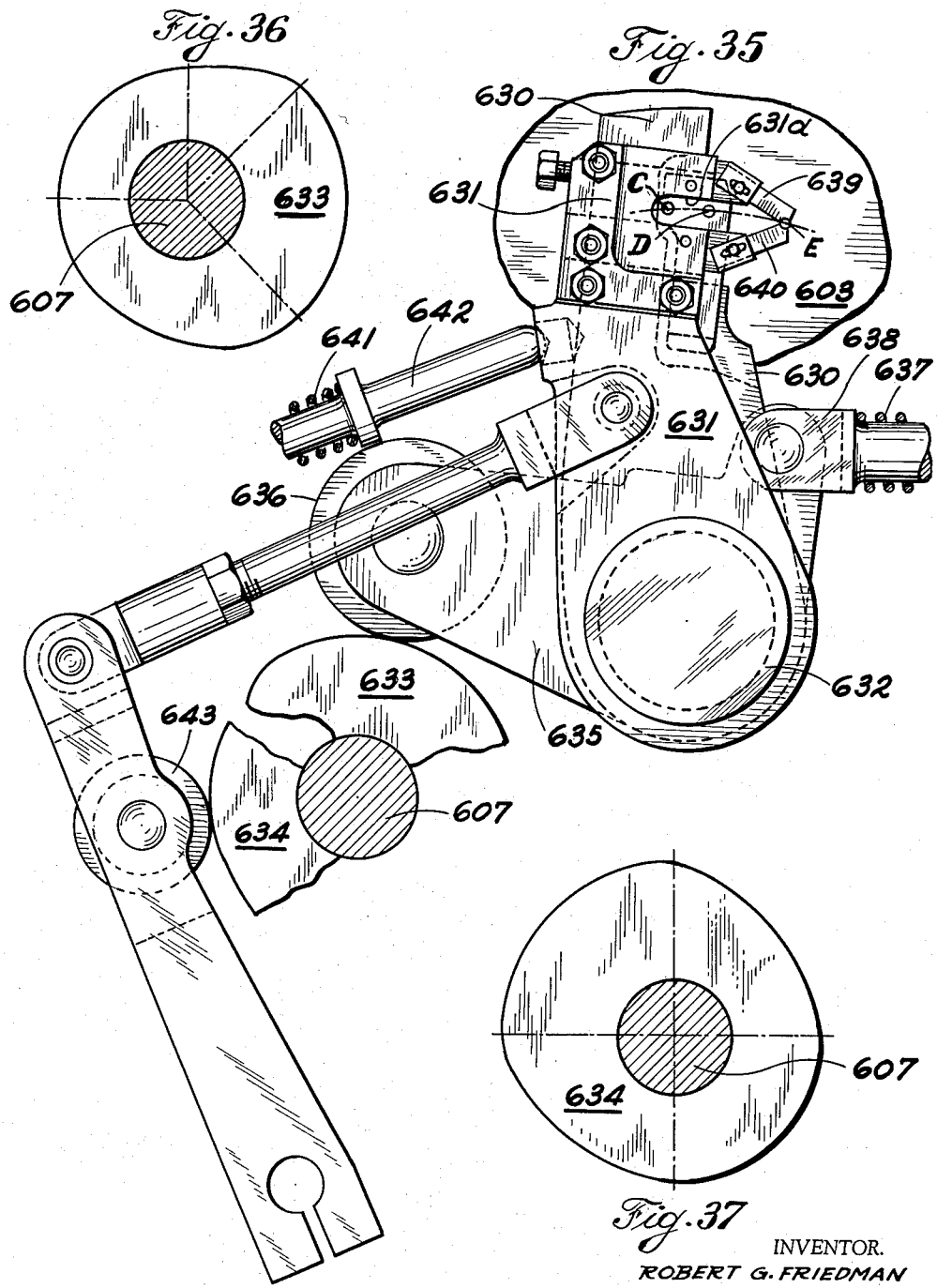

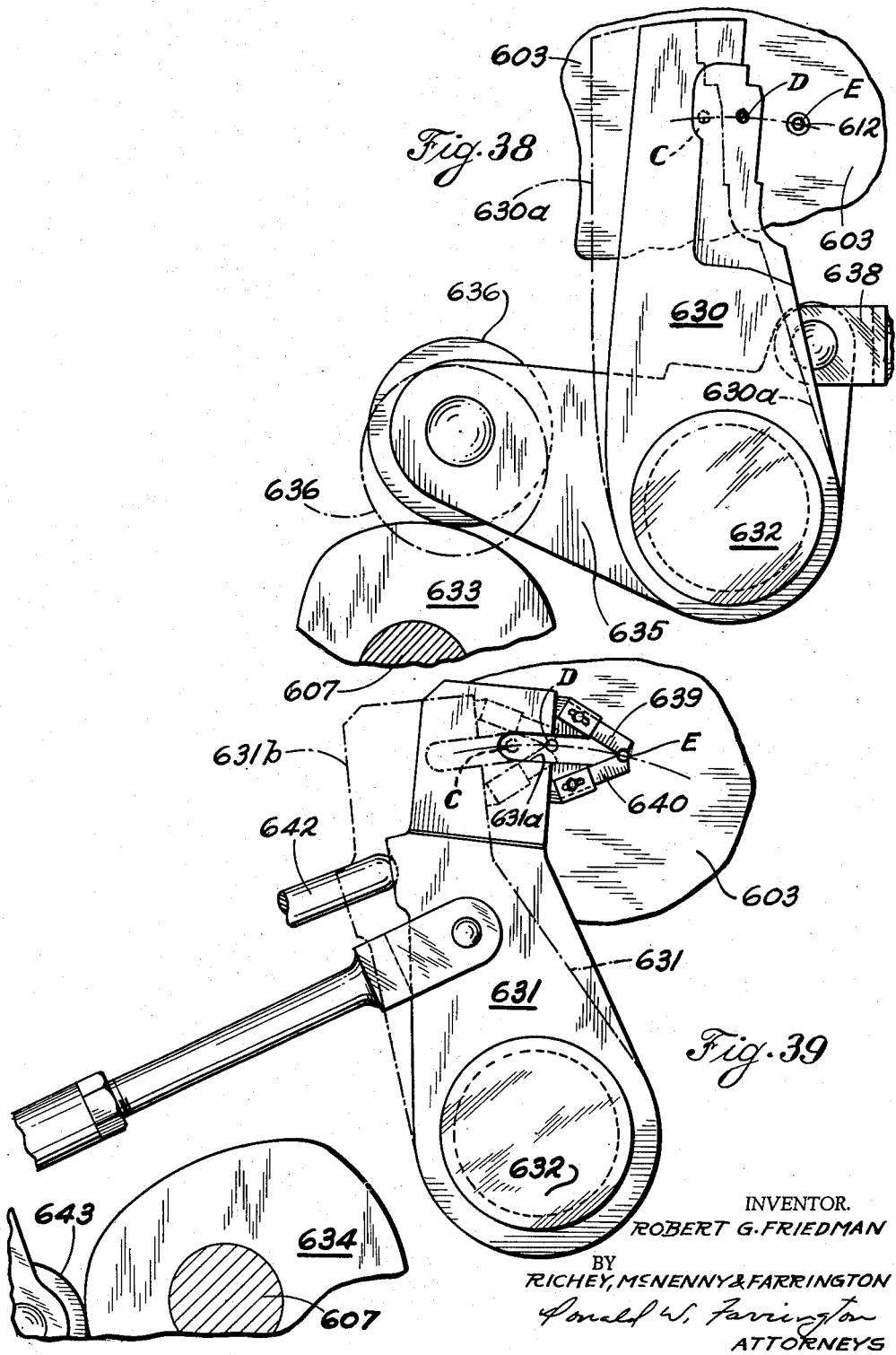

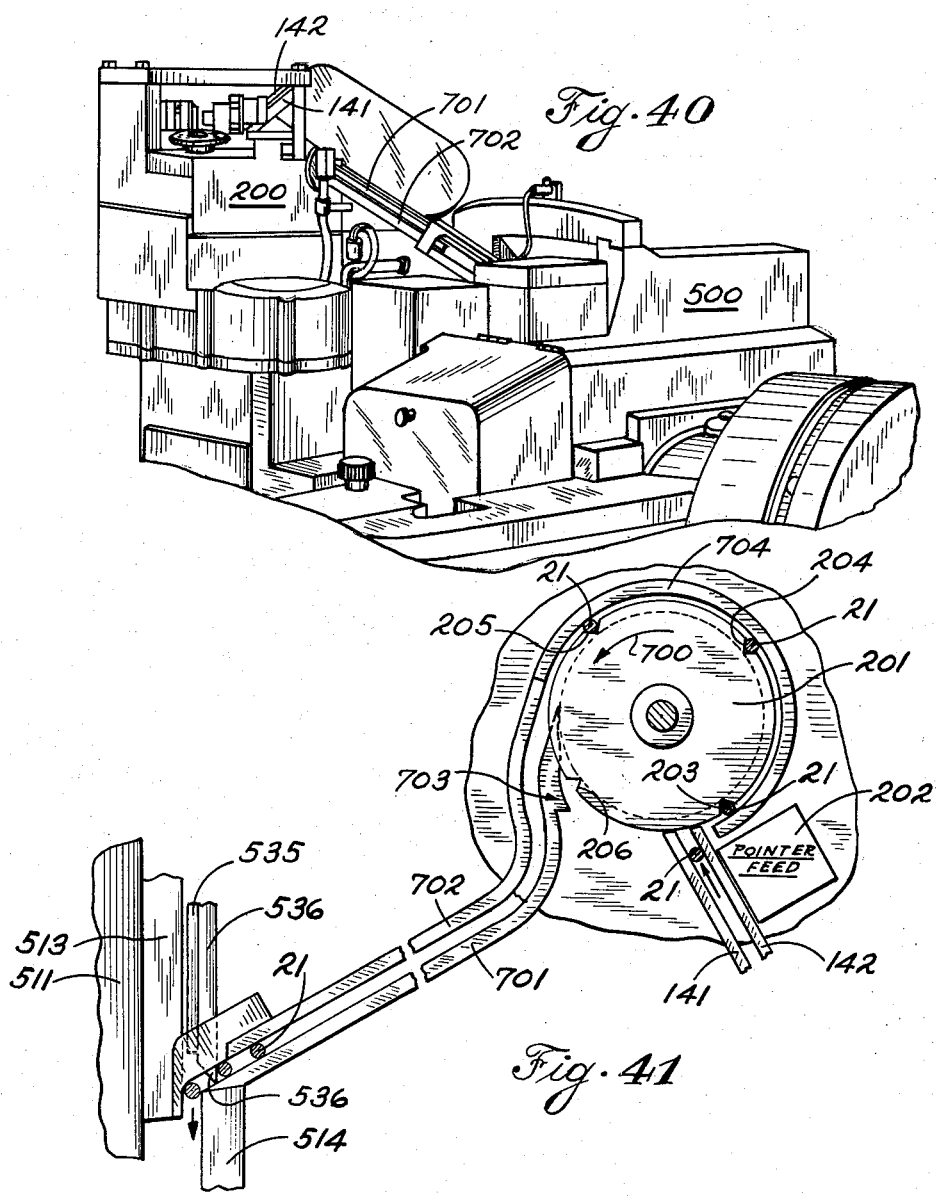

3,116,499
MACHINE FOR MAKING BOLTS
Robert G. Friedman, Tiffin, Ohio, assignor to The National Machinery Company, Tiffin, Ohio, a corporation of Ohio
Filed Oct. 30, 1958, Ser. No. 770,805
5 Claims. (Cl. 10—11)

This invention relates to the manufacture of bolts, screws and similar headed or upset metal articles, and more particularly to a high speed machine and method for cold heading and finishing such articles without intermediate handling.

Heretofore certain headed, threaded fasteners have been made on combined machines in which lengths of wire stock are cut off and transferred successively to a plurality of dies, in each of which the blanks are struck by cooperating heading or forming tools, after which the blanks are transferred to a pointer which machines or cuts a point on the end of the shank, and then to a roll threader.

The maximum speed of such machines is limited by the necessity of transferring blanks to each of the heading dies in turn, and by the speed at which points can be cut on the shanks in the pointer station. Transferring the blanks between dies requires ejecting the blank from one die after it has been struck by a heading tool, gripping the blank with transfer fingers before it drops from the die, carrying the blank into axial alignment with the next die and holding it until the next heading tool starts the blank into the die, and then moving the transfer fingers out of the path of the heading tool and back to the first die in time to grip the next blank. The rate at which the knock-out pins and transfer fingers can be accelerated and moved is limited by the necessity of holding and controlling the blanks.

In addition, a great many articles cannot be made on such machines. Articles with extremely short shanks cannot be successfully gripped and transferred from one heading die to another. Other articles having heads with forged non-circular recesses or projections, or polygonal portions between the head and the shank, cannot be satisfactorily produced on such machines because of the difficulty or impossibility of preventing rotation of the blanks about their axes during their transfer from one heading die to another. Other articles, such as screws having slots cut in the head, cannot be made on such machines because the slots must be cut, and the burrs from the cutting operation removed, after heading and before roll threading, and it has not been possible to perform such operations on the prior machines.

All of such articles which for one reason or another could not be made on the prior combined machines have heretofore been manufactured by the batch process in a plurality of separate machines, the output of each machine being collected in containers or tote boxes and transported to another machine or group of machines for succeeding operations. In such batch manufacture all sequence of blank working is lost between successive operations on the blanks and, in order to attain any degree of efficiency, it is necessary to maintain a substantial reserve of blanks ready for each machine or group of machines for performing a particular operation. This necessary reserve accumulation substantially increases the cost of manufacture, both by the cost of carrying the large inventory of blanks in process and the fact that small imperfections resulting from improper adjustment, or the like, of one machine may not be detected until the imperfect blanks are processed on the nxt succeeding machine, requiring the scrapping of the entire reserve accumulation of blanks from the improperly adjusted machine.

The batch process has many other defects and disadvantages which have heretofore been endured by necessity in the manufacture of the large numbers of cold headed fasteners, and the like, which could not be made on the prior combined machines. Cold heading or forming of steel or similar metal carried out at temperatures below the temperature of rapid grain growth or recrystallization, flows and refines the grain structure of the metal, and is followed by "age hardening," during which the hardness of the metal progressively increases and the ductility progressively decreases with the passage of time after the cold working. Thus the hardness and ductility of cold worked blanks changes with the elapsed time after working, this change continuing during a period of several days. Cold headed blanks reaching the finishing machines in the batch process vary in hardness and ductility because of the loss of sequence, necessitating adjustments one way or the other of machines such as slotters and roll threaders, which adjustments would not be required if the blanks were all uniform.

Similarly, substantial amounts of heat are created in the blanks by cold heading and forming operations, and the loss of sequence of the blanks in the batch process increases costs and reduces efficiency because of variations of temperature of the blanks reaching the finishing machines, or by a further increase of the inventory of blanks in process.

The present invention removes the limitations on maximum speed of operation of the prior combined header machines by performing all the heading operations in a single die, eliminating the necessity of catching and holding the blank when it is ejected from the heading die; by performing intermediate operations while the blanks are moving at constant speed in substantially a single plane, without accelerating or decelerating the blanks between operations; and by providing a path of travel for the blanks and the mechanism for performing intermediate operations, which path may be made of sufficient length to provide the time required for any intermediate operation at the optimum working speed without imposing any limitation on the speed of the heading mechanism or on the rate of production of finished blanks.

At the same time the present invention greatly increases the speed and efficiency and reduces the cost of manufacture of articles which could not be made on prior combined machines, by cutting off and heading in a single die successive lengths of wire or rod stock, and in the same machine and with a minimum lapse of time subjecting the headed blanks to the necessary secondary operations to produce the desired finished articles, while maintaining the blanks in substantially the same consecutive order. Thus the blanks worked in each operation are uniform in properties with the maximum possible ductility, and each operation serves as an automatic inspection of all previous operations, permitting correction of any maladjustment before any substantial quantity of imperfect blanks are produced.

According to one feature of the invention, cut-off blanks are successively headed and released; conveyed to an orienter; delivered in substantially the same consecutive order to moving enclosures which carry them continuously through a predetermined path, during which they are shaped by forming and/or cutting tools moving with the blanks; after which the blanks are positively delivered, in the same consecutive order, to roll threading mechanism from which they are ejected as finished articles at the same rate of speed as the heading operation.

According to another feature of the invention, blanks which must be pointed are headed in a die while the ends of the blanks are supported and squared up by a knock-out pin having substantially the full diameter of the die, after which the squared up ends of the blanks are pressed into a conical throat to flow point the blanks without waste of material.

According to another feature of the invention, means driven in timed relation to the header carries each blank and a conical pointing throat along a path of a length sufficient to permit the squared up end of the blank to be pressed the desired distance into the throat, so that the blanks are pointed at the same rate at which they are headed.

According to another feature of the invention, means driven in timed relation to the header carries each headed blank and a slot cutting means along a path in which a slot is cut at the optimum cutting and feeding speed, the length of the path being sufficient to allow completion of the slot and the number of cutting means and blank holding means being sufficient to maintain the rate of slotting equal to the rate of heading.

According to another feature of the invention, blanks which have been slotted are carried on without stopping through a deburring mechanism in timed relation to the heading and slotting.

According to another feature of the invention, headed and threaded blanks are produced from successive cut off lengths which are struck twice by different heading punches in a single die and transferred in substantially the same consecutive order, with or without intermediate pointing, slotting and deburring operations, to roll threading dies driven in correct timed relation to maintain the rate of threading equal to the rate of heading. According to this feature of the invention the blanks are threaded in substantially the same consecutive order as the heading and other intermediate operations, if any, and after substantially the same lapse of time, so that all of the blanks are at substantially the same temperature and have been subjected to substantially the same degree of age hardening after heading and pointing. Thus the threading load and consequent spring of the threading dies is substantially uniform for all of the blanks, and wear of the heading die, producing a gradual increase in shank diameter, may be compensated for by adjustment of the threading dies to give maximum production from each die without producing any substantial quantity of imperfect blanks or scrap.

According to another feature of the invention compactness of the machine, simplicity of the driving mechanism, accessibility of the blank working elements and a maximum of positive control of the blanks are achieved by dropping the blanks from the heading die into an elevator mechanism which carries the blanks to the top of the machine and drops them into an orienting chute, after which the blanks are positively fed into a dial, or the first of a series of dials, which maintain positive control of the blanks while carrying them without stopping through a path arranged in substantially a single plane in which path some or all intermediate operations such as pointing, slotting and deburring are carried out, after which the blanks are positively fed into a thread roller and discharged as finished articles from the machine.

According to another feature of this invention, a metal cutting operation, such as slotting, is performed with accuracy and maximum tool life while the blanks are continuously moving along a predetermined path, by gripping each blank positively against a moving plate or dial which also carries and guides the cutting tool, preventing any movement of the blank relative to the tool.

According to another feature of this invention, increased speed of operation of the heading mechanism and an improved cut-off of the blanks are achieved by cutting the blanks from the wire or rod stock with a solid cutter which surrounds and confines the blank, moving each blank in the solid cutter only part of the distance from the wire feed to the die, and ejecting each blank into gripping fingers which carry it into alignment with the die and recede when it is started into the die by the first punch, thereby minimizing the mass of the parts which must be accelerated and decelerated during delivery of the blank to the die, and minimizing the rate at which the relatively massive solid cut-off member must be accelerated and decelerated.

Other objects and advantages relating to an improved headed fastener product, low cost of manufacture and long life of dies and cutting tools for forming the blanks will appear from the following detailed description of preferred embodiments of the invention.

In the accompanying drawings:

FIG. 13 is an elevation of the upper portion of the elevator mechanism showing the orientation of the blanks for travel to the pointer;

FIG. 13a is a view taken at 13a—13a of FIG. 13 showing means to align blanks;

FIG. 15 is a perspective view showing the blanks coming from the elevator to the pointer dial, the transfer dial to take blanks from the pointer to the slotter, the slotter dial and the deburring dial which takes the blanks from the slotter through the deburring station to the track which leads to the roll thread;

FIG. 15a is a plan view showing a blank being moved through the deburring station;

FIG. 15b is a sectional view as indicated at 15b—15b in FIG. 15a;

FIG. 15c is an enlarged detail showing of the means for moving a blank from one dial to another;

FIG. 16 is a diagrammatic plan view showing the drive for the pointer, slotter and deburring mechanism;

FIG. 22 is an elevation showing the saw and saw arbor mounting which is a part of the slotter;

FIG. 23 is an enlarged sectional view taken on the plane 23—23 of FIG. 22;

FIG. 27 is a perspective view taken at one side of the rear portion of the machine with the fly wheel removed showing the gear drive from the crank shaft to the half-speed shaft and the linkage drive from the half-speed shaft to the roll threader;

FIG. 28 is a plan view of the roll threader showing the blank feed mechanism for the roll threader;

FIG. 29 is an elevation showing the feed mechanism for the roll threader;

FIG. 30 is a plan view of a portion of the track leading the blanks to the roll threader portions of the feed mechanism;

FIG. 31 is a view similar to FIG. 30 showing a part of the feed mechanism in a gating position at the roll threader;

FIG. 31a is an elevation showing the drive mechanism for operating the roll threader feed;

FIG. 31b is an end view of the roll threader feed;

FIG. 32 is a plan view with parts in section of the bed frame of the machine according to my invention showing the header slide, crankshaft and the drive for moving the header slide tools;

FIG. 33 is an elevation in section of the header showing the header slide and the drive for the knock-outs;

FIG. 35 is an elevation with parts in section showing the shear and transfer mechanism for the header;

FIG. 36 is an elevation of the cam to drive the shear;

FIG. 37 is an elevation of the cam for driving the transfer;

FIG. 38 is an elevation showing the two positions of the shear;

FIG. 39 is an elevation showing the two positions of the transfer;

FIG. 40 is a perspective showing of a modified form of apparatus wherein the pointed blanks are conducted from the pointer to the roll threader;

FIG. 41 is a plan view of the apparatus of FIG. 40.

Figure 1:
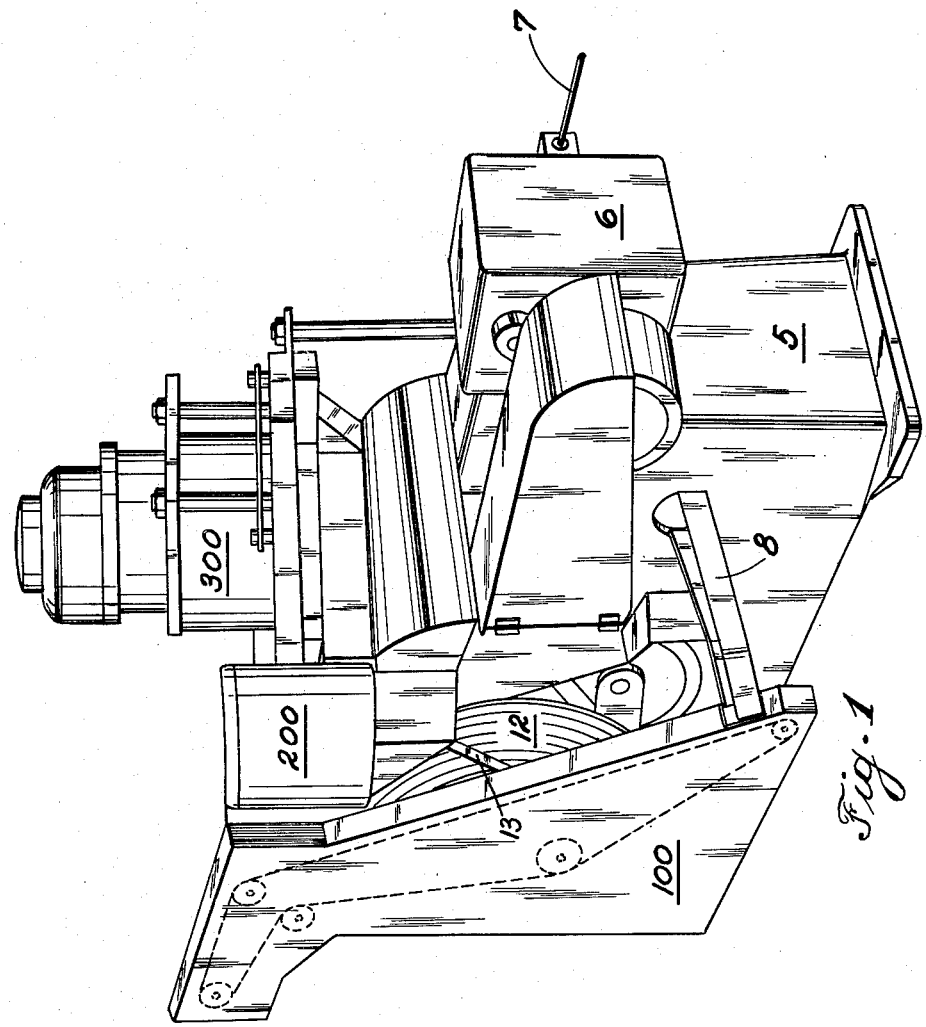
FIG. 1 is a perspective view of the complete machine viewing the machine from front and at the left side thereof.

Referring to FIGS. 1–39 inclusive of the drawings a preferred embodiment is illustrated in which cut-off blanks are headed by two blows in a single die, are carried continuously through intermediate forming and cutting operations, which in the illustrated embodiment are flow pointing, slotting and deburring, and are finally roll threaded. A bed frame 5 is provided with a feed mechanism 6 to intermittently advance wire or rod stock 7 into a shear which cuts lengths of the wire stock 7 and transfers the cut blank to a single die 612 in the bed frame. A reciprocating header slide 602 is carried by the bed frame 5 and is arranged to perform two working blows on the cut blank held in the bed frame die. After the blank is twice worked by the header blows and is completely headed it is ejected from the bed frame die and is discharged through the side of the bed frame by way of inclined chute 8 where it rolls by gravity into the lower portion of the elevator indicated in its entirety as at 100. The headed blanks are carried by the elevator 100 upwardly and conducted therefrom to a pointer mechanism indicated in its entirety as at 200. The blanks are pointed by a pressure operation in a die 250 in the pointer and thereafter transferred to a slotter mechanism indicated in its entirety as at 300.

Figure 2:
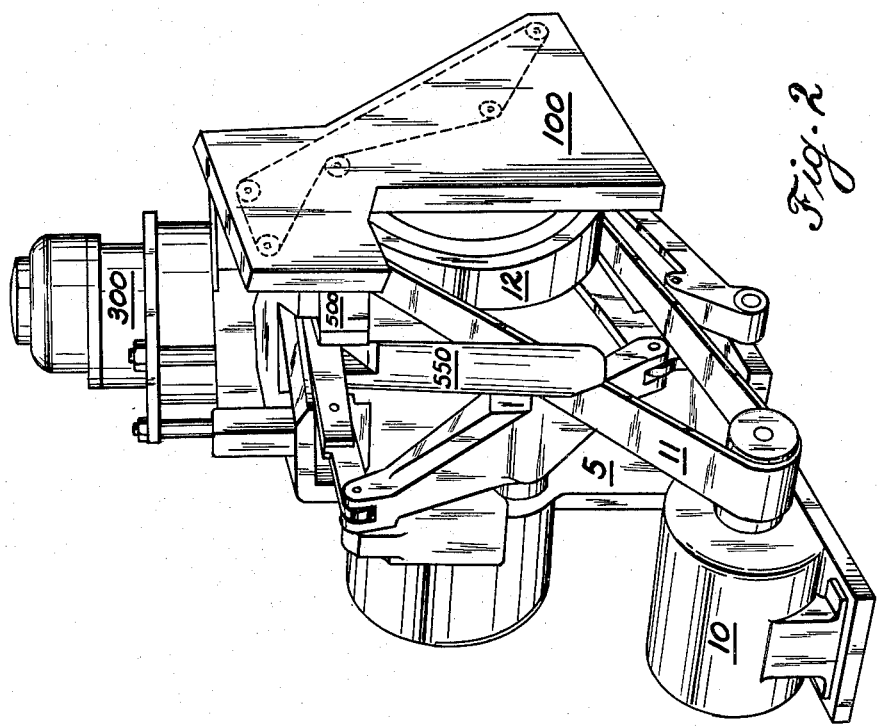
FIG. 2 is a perspective view of the machine as viewed from the rear thereof and at the same side of the machine as FIG. 1.
Figure 3:
FIG. 3 is a view of the cut blank employed for making the headed fastener.
Figure 4:
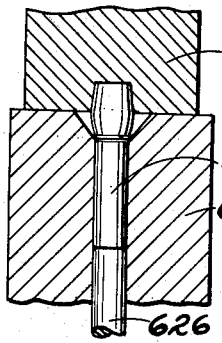
FIG. 4 is an elevation with parts in section showing the bed frame die and the first forming operation on the blank.

In the slotter the blanks are carried in a slotter dial and, after being slotted by a rotary saw 350, are discharged from the slotter and carried through a deburring station to a reciprocating roll threader indicated in its entirety as at 500 (see FIG. 2). An electric motor 10, by means of belt 11, drives a fly wheel 12 which is keyed to the crankshaft 600 arranged transversely of the bed frame 5.

As will appear from the description which follows, the blanks, after having the threads rolled on the shank portion, are discharged through the chute 550.

Figure 5:
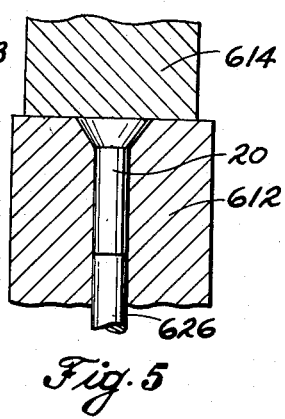
FIG. 5 is a view similar to FIG. 4 with the blank retained in the same bed frame die and the second forming operation being carried out.
Figure 6:
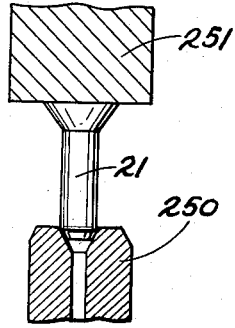
FIG. 6 is an elevation with parts in section showing the blank being pointed in a die.
Figure 7:
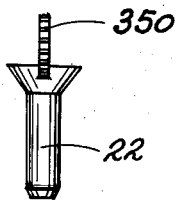
FIG. 7 is an elevation of the blank with a rotary saw in lowered position and cutting a slot in the head of the blank.
Figure 8:
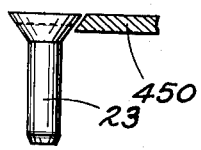
FIG. 8 is a view of the slotted blank showing the relation between the blank and the tool for removing the burr resulting from the sawing operation.
Figure 9:
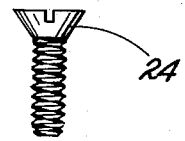
FIG. 9 is an elevation of the blank having the thread rolled thereon.

FIGS. 3 to 9, inclusive, illustrate the forms of one particular blank obtained by the successive working steps carried out in the machine of the present invention. The blank as sheared from the wire stock 7 is indicated at 15 in FIG. 3. This cylindrical blank 15 is transferred from the shear to the die 612 carried in the bed frame and there is hit the first blow by the header slide tool 613 so as to form the blank 18 having a conical upset head. In the die 612 the blank 15 is backed up by the knock-out pin 626, which is preferably a flat faced pin of substantially the full diameter of the die so as to square up the end of the shank to facilitate the novel pointing of this invention. The blank 18 remains in the die 612, as shown in FIG. 5, and thereafter a second header slide tool 614 further upsets the head to form the headed blank 20 shown in FIG. 5. The heading tools 613 and 614 are formed to produce the desired head shape and form. Any desired recesses or projections may be formed in the two steps, since the blank remains stationary between the two blows. The blank 20 is ejected from the die 16 and falls by gravity downwardly from the die breast into an inclined chute 8 leading out through the wall of the bed frame 5. The blank 20 is then carried upwardly from the chute 8 to the pointer 200 where the blank is pressed axially between a pointing die 250 and a member 251 to form the pointed blank 21. The pointed blank 21 is then transferred to the slotter where the rotary saw 350 cuts a slot transversely of the head of the blank to form the slotted blank 22. Thereafter the slotted blank 22 is carried through a deburring station wherein a deburring knife 450 cuts off the chips and whiskers resulting from the sawing operation so as to form the deburred blank 23. From the deburring apparatus the blank is carried through a track and feed mechanism to the roll threader 500 wherein the shank of the blank has threads rolled thereon so as to provide the completed bolt 24.

The elevator, indicated in its entirety as at 100, includes a pair of spaced side walls supporting an inclined elevator plate 101. A pair of chains are arranged over spaced co-axial chain sprockets between the side walls of the elevator. Sprocket 102 is at the bottom of the elevator and sprocket 103 at the top of the elevator adjacent the upper end of the inclined elevator plate 101. Sprocket 104 is located at the rear of the upper portion of the elevator. The chains return over sprocket 105 and drive motor sprocket 106. An electric motor 107 drives the sprocket 106 and thus moves the chains so as to carry the chains upwardly in the direction of the arrow 108 of FIG. 10.

Figure 14:
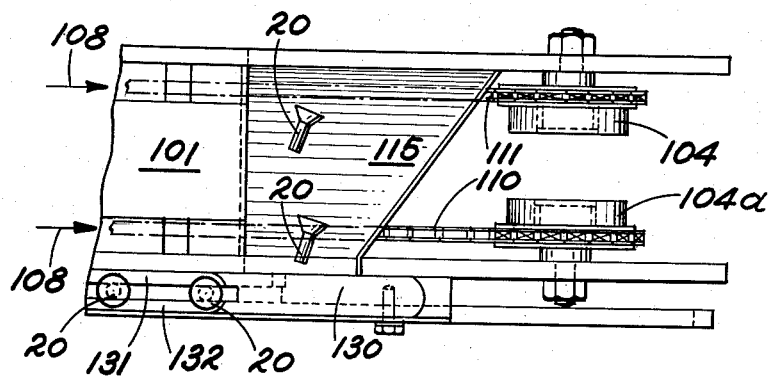
FIG. 14 is a plan view of the upper portion of the elevator showing a trough into which the blanks fall in being discharged at the top of the elevator.

As shown in plan view in FIG. 14, the chain and sprocket arrangement includes the spaced parallel chains 110 and 111. Sprocket 104 is also shown in FIG. 14 and the corresponding coaxial sprocket 104a is on the opposite wall of the elevator. Between the two chains 110, 111, traversing the sprockets as described are secured spaced elevator plates or flights 112 which are fixed to align links of the two chains so as to remain perpendicular thereto and extend flush with or below the links of the chains so that the lower edges of the plates 112 ride along the upwardly inclined elevator plate 101.

Thus the plates 112 form with the inclined plate 101 elevating pockets moving upwardly and blanks carried in the pockets move to the discharge station indicated in its entirety as at 114. The discharge station 114 includes a pocket 115 underneath the chains at the top of the elevator beyond the upper end of the plate 101, so that the blanks 20 carried up along the plate 101 fall by gravity into the pocket 115 when they reach the top of the elevator.

Figure 11:
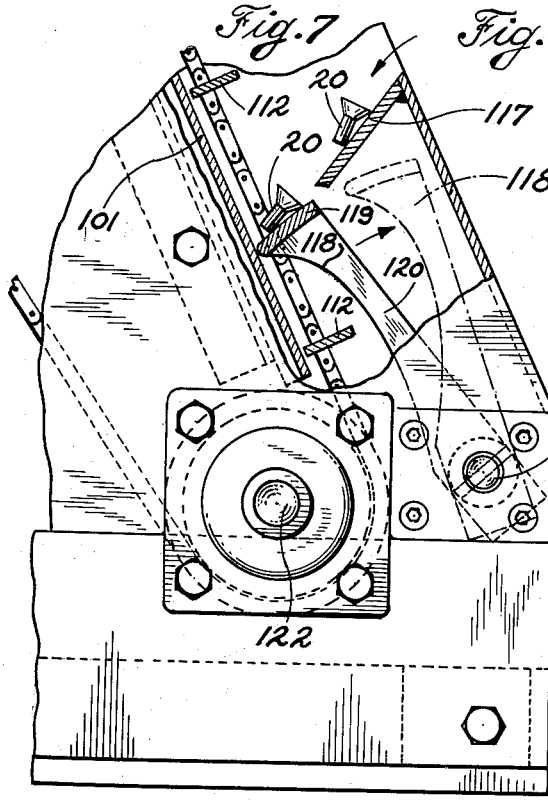
FIG. 11 is an enlarged view with parts in section of the lower portion of the elevator showing the gating mechanism for guiding the headed blanks into the elevator.
Figure 10:
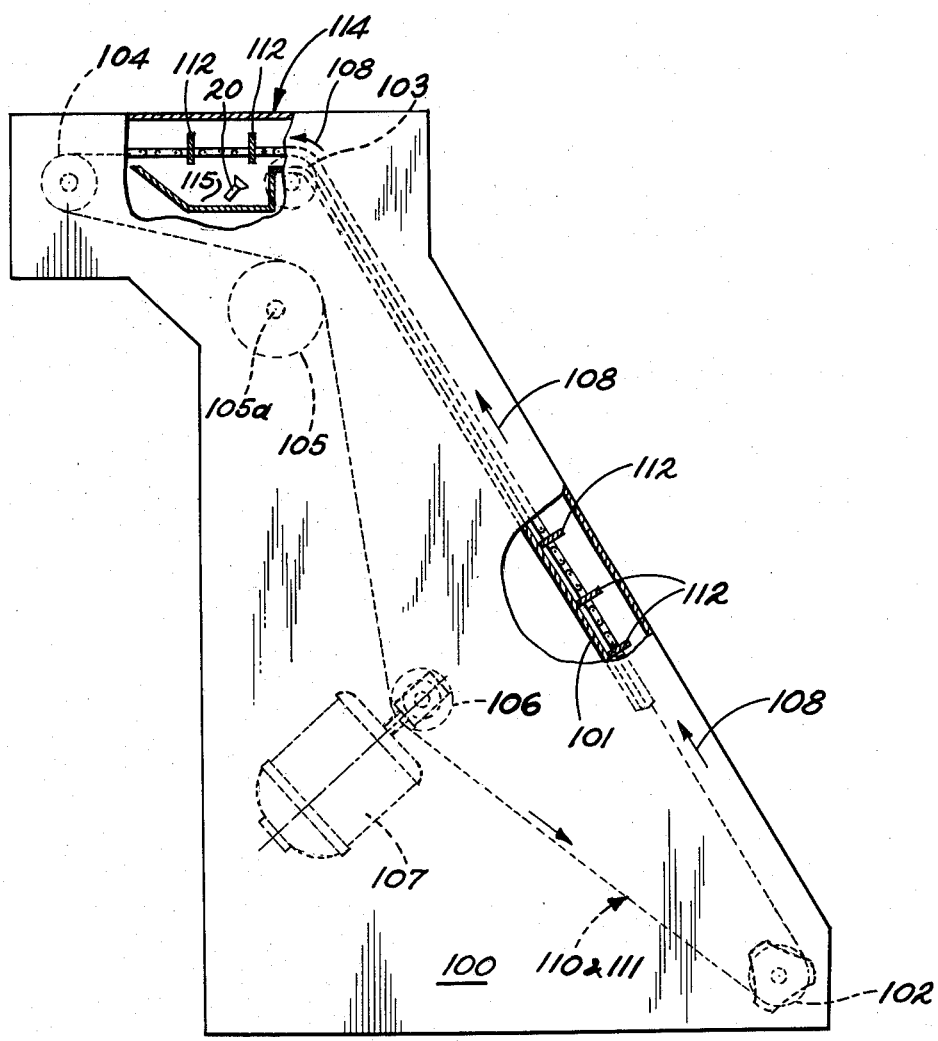
FIG. 10 is a side view with parts in section of the elevator for carrying the blanks up from the heading operation to the pointing operation.
Figure 12:
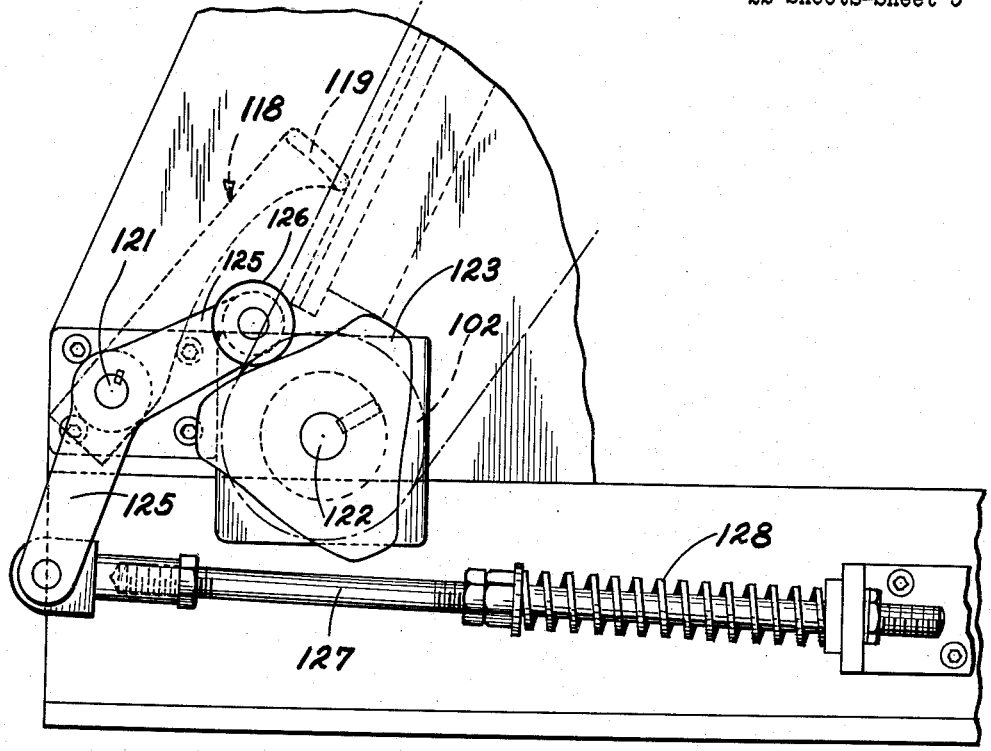
FIG. 12 is a view similar to FIG. 11 but taken from the opposite side of the elevator.

The blanks are introduced at the bottom of the elevator by falling from the lower end of the chute 8 leading from the header. The blanks 20 fall, as shown in FIG. 11, against a downwardly inclined plate 117 and thence from the plate 117 the blanks fall into the pockets formed between adjacent plates 112. To prevent the blanks 20 from falling down toward the bottom of the elevator before a plate 112 is in position to receive the blank, a gate 118 is provided. The gate 118 includes a cover portion 119 and side portions 120 which are pivoted to the elevator at 121.

The chain sprocket 102 is fixed to a transverse sprocket shaft 122 and this sprocket shaft 122 carries a cam 123. The pivot shaft 121 secured to the gate 118 has fixed thereto a bellcrank 125. One arm of the bellcrank carries the cam follower roller 126 and the other arm of the bellcrank is pivoted to the spring rod 127. The spring rod arrangement includes spring 128 arranged to bias the roller 126 against the cam 123.

The cam 123 is fixed to the shaft 122 so that the gate 118 is synchronized with the upward movement of the plates 112. Referring to FIG. 11 the gate 118 is shown in phantom outline which corresponds to the position of the gate when a plate 112 traverses the open lower end beneath the plate 117. Thus the gate 118 remains in its full line position as the blanks 120 fall from the chute 8 until a plate 112 approaches the cover 119. Thereafter the gate swings to its dotted line position to permit the plate 112 to pass upwardly and carry the blanks up along the elevator plate 101. It will be noted that the cover member 119 of the gate swings beneath the lower edge of the plate 117 and thus any blanks resting on the gate are scraped off of the gate and into the pocket formed by plate 112 and plate 101.

As shown in FIG. 14 the blanks are carried by the chains to the trough or pocket 115 in the direction indicated by the arrows 108. The inclined plate 101 is terminated at the edge of the pocket 115 so that the blanks 20 fall into the pocket in response to gravity. The bottom of the pocket 115 is inclined transversely so as to guide the blanks 20 downwardly and transversely of the elevator and out of the end of the pocket and onto a trough or orienter 130. The trough 130 is mounted on the side of the elevator (see FIG. 13) and is inclined downwardly and terminates at its lower end in a pair of upwardly inclined rails 131 and 132. The spacing between the rails 131 and 132 is such as to accommodate the shank of the blank 20 and, as the blanks 20 slide by gravity down the chute 130, they are disposed to drop with the shank downwardly inbetween the rails 131 and 132.

The chain sprocket 105 near the top of the elevator is fixed to a transverse shaft 105a which projects through the side of the elevator adjacent the rails 131 and 132. The chain sprocket 134 is secured to the shaft 105a on its projecting end and a chain 136 is driven by the sprocket 134. The chain moves around an idler sprocket 137 and a tension sprocket 138. The chain 136 rides on a chain support 136a parallel to rails 131—132. At spaced intervals along the chain 136 outwardly projection teeth 140 are fixed. The teeth 140 are proportioned to project upwardly between the rails 131 and 132 so that members 140 bear against the shank of the blanks 20 and carry such blanks upwardly between the rails 131 and 132.

The rail 132 is in alignment with and abuts against a downwardly disposed rail 141 and the rail 131 abuts with and merges into the downwardly disposed parallel rail 142. The juncture between the oppositely sloping portions of the tracks thus formed is above the sprocket 137 so that the teeth 140 carry the blanks over the juncture and push the blanks downwardly along the rails 141 and 142. In the event some of the blanks 20 fail to fall shank downwardly between the rails 132 and 131 and are carried up the tracks transversely of the track, such blanks are moved into the path of a plurality of depending coil springs 146 which either bump the blanks into alignment with the tracks 131 and 132 or push the blanks entirely off of the tracks and down into a chute 144 (see FIG. 13a).

The coil springs 146 are carried by a plate 145 disposed generally parallel and above the track sections 131 and 132. The coil springs depend from the plate 145 in a staggered arrangement so as to re-align the shanks with the space between the rails. Blanks which are properly aligned with the shanks down between the rails 131 and 132 are not affected by the coil springs 146 because such blanks are riding in a stable fashion and the springs 146 are not positioned to tip the blanks out of the track. Transversely disposed blanks, however, are free to slide laterally and will be nudged back and forth across the tracks 131—132 by the staggered springs 146 until they fall shank downwardly between the tracks or are pushed entirely off of the tracks into the elevator by inclined chute 144 carried adjacent track 132. The chute 144 is sloped toward an opening above the inclined elevator plate 101 so that such blanks as may be pushed off the tracks are again carried up by the elevator chains and again dropped into the trough 115.

The downwardly inclined tracks 141—142 terminate at a pointer dial 201 as illustrated in FIG. 15. A pointer feed mechanism indicated in its entirety as at 202 is arranged at the juncture between the dial and the tracks 141—142 and such pointer feed moves in timed relation to the dial 201 so as to feed a blank from the track 141—142 into a notch on the pointer dial 201. The pointer dial has four notches in its periphery indicated at 203, 204, 205 and 206. The pointer dial turns in the direction of the arrow 207 and as the blanks are carried around the pointer dial they are pointed and thereafter transferred to a transfer dial 208.

The transfer dial 208 is also provided with four notches and turns in a direction opposite, but in synchronism with, the pointer dial 201. Blanks carried by the transfer dial move about the dial in the direction of the arrow 209 and are transferred from the dial 208 to a slotter dial 301. The slotter dial turns in the direction of arrow 302 and carries the blanks received from the transfer dial around to a discharge point indicated at 303 where the slotted blanks are transferred to a deburring dial 401.

The deburring dial 401 is provided with four stations and blanks are carried around the deburring dial in the direction of the arrow 402. Each of the deburring stations indicated at 403—404—405—406 is provided with a cutter 407 which is beveled as indicated in FIG. 15b to bear against the underside of the head of a slotted blank 23. As the blanks are carried by the deburring dial, the shanks of the blank engage a knurled section 410. As best shown in FIG. 15a, the blanks are supported in the deburring dial by rollers 411 and 412 which bear against the shank of the blank with the underside of the head portion of the blank bearing against the cutter 407. As the shank of the blanks engage the knurled section 410 they are caused to rotate about their axes and such rotation past the cutting edge of the knife 407 trims away the whiskers or burrs of metal projecting from the underside of the head and resulting from the sawing operation. Thus the burrs and whiskers are removed from the blanks during their travel through the deburring dial 401. The deburred blanks 23 are moved off of the deburring dial onto a pair of downwardly inclined rails 501–502 which lead to the roll threader. Thus the blanks after deburring are guided in a shank-down manner and are supported by their heads as they slide downwardly along the tracks 501 and 502 to the roll threader.

Figure 17:
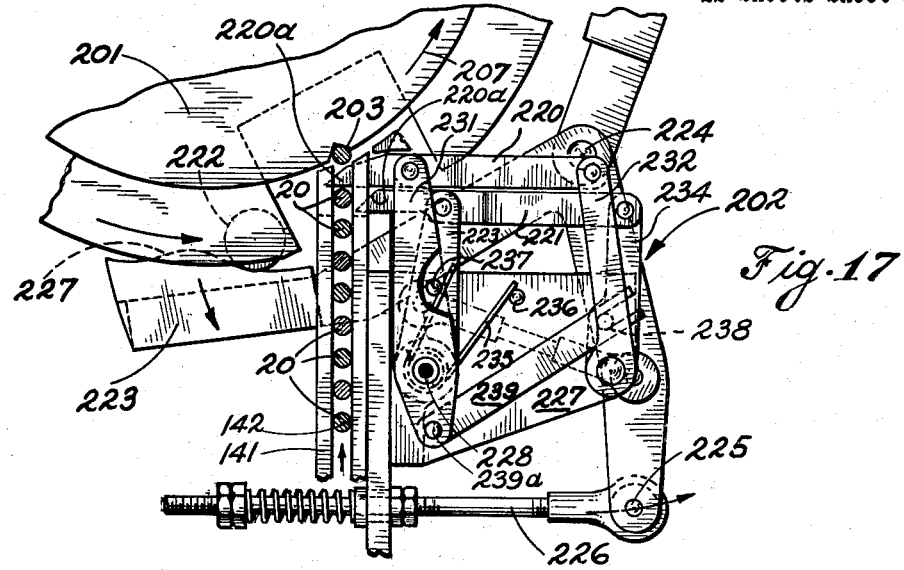
FIG. 17 is a plan view showing the feed mechanism for feeding blanks to the pointer.
Figure 18:
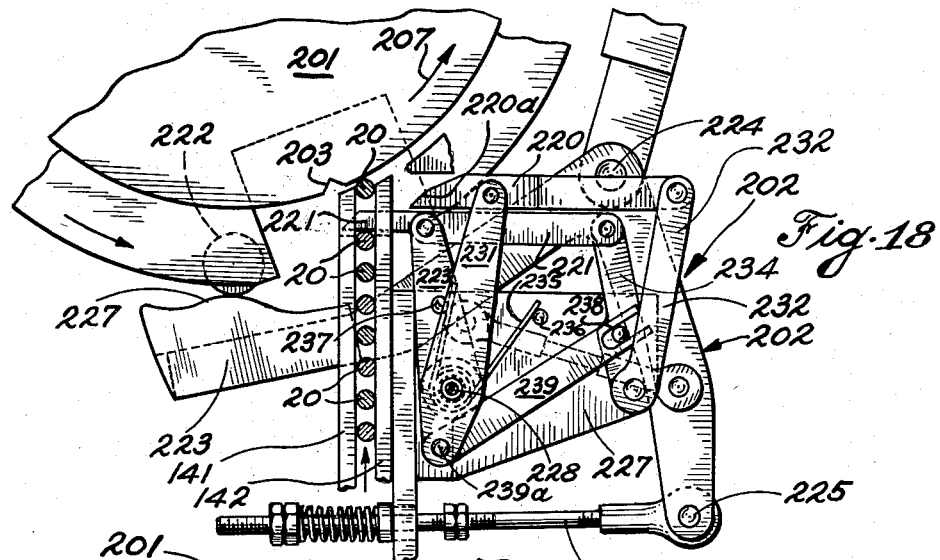
FIG. 18 is a view similar to FIG. 17 showing a finger on the pointer feed mechanism in a gating position.
Figure 19:
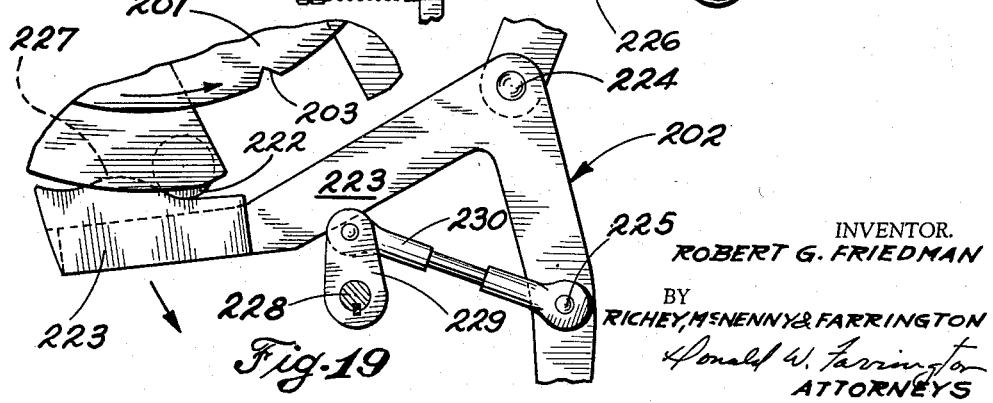
FIG. 19 is a view showing the oscillating drive for the pointer feed mechanism.

The pointer feed indicated in its entirety as at 202 is illustrated in detail in FIGS. 17, 18 and 19. Generally speaking the feed mechanism comprises a pair of oscillating blades 220 and 221 which alternately move into and out of the lower end of the track formed by rails 141 and 142. In FIGS. 17 and 18 the shank portion of a series of blanks are shown in cross-section in the track 141—142. In FIG. 17 the starter blade 220 has been advanced into the track and the inclined end face 220a of the starter blade has cammed a blank 20 from the track into the notch 203 of the pointer dial. As this occurs a portion of the starter blade is disposed transversely of the blank track and thus gates or holds back the series of blanks above the starter blade 220. The separator blade 221 is withdrawn from the track as this occurs. As shown in FIG. 18 the empty notch 203 of the pointer dial is approaching the pointer feed mechanism in the direction of the arrow 207. At this time the starter blade 220 is retracted and a blank 20 is at the bottom of the track and bears against the edge of the pointer dial. During this phase of the feed the separator blade 221 is serving to gate or hold back the series of blanks above that blank which is adjacent the rim of the pointer dial.

A roller 222 is carried by the pointer mechanism and is carried around with the dial 201 and the roller 222 is arranged to engage a bellcrank 223 which is pivoted at 224. The outer end of the bellcrank 223 is pivoted as at 225 to a rod 226 that is spring-biased so as to hold the cam surface 227 of the bellcrank in engagement with the roller 222. The rocking motion of the bellcrank 223 imparted thereto by the roller 222 is transmitted to the blades 220 and 221 of the feed mechanism.

The pointer feed mechanism 202 includes a supporting plate 227 and journalled in this plate is a feed drive shaft 228. The lower end of the drive shaft projects beneath the plate 227 and has keyed thereto an arm 229 which is connected by a link 230 to the bell crank 223. The upper end of the shaft 228 has fixed thereto an arm 231 which is pivoted at one end to the starter blade 220. An arm 232 is pivotally mounted on the supporting plate 227 at one end and is pivoted to the outer end of the starter blade 220 at its other end. Thus the members 231 and 232 along with their pivotal connections form a parallel linkage arrangement to guide the starter blade 220 in its oscillating motion. Similar pivotal members 233 and 234 pivotally guide the separator blade 221 in its oscillating motion with respect to the blank track 141–142.

A spring 235 is wrapped about the shaft 228 and has one end thereof bearing against a pin 236 in supporting plate 227 and its other end bearing against a pin 237 on the link member 233. The spring 235 is wound under tension and thus normally urges the member 233 about its pivot in a counter-clockwise direction and, therefore, normally urges the separator blade 221 into a position such as shown in FIG. 18.

The member 234 is provided with a pin 238 which rides in a slot in link 239 which is pivoted as at 239A on the end of member 231. The spring 235 urging the member 234 about its pivot in the supporting plate in a counter-clockwise direction also urges member 231 in a clockwise direction. The result of this linkage arrangement is that when the shaft 228 is rocked about its axis by the link 230 and the bellcrank 223, the starter blade 220 is moved into and out of the tracks 141 and 142 carrying the blanks 20 down to the pointer.

The motion imparted to the member 231 is transmitted by means of link 239 and the pin 238 to the parallel linkage 233—234 for the separator blade 231. It will be observed that when the blade 220 is moved to the left so as to enter the tracks 141—142, it will, toward the end of its motion, transmit an opposite movement to the separator blade 221. The slot in the member 239 and the pin 238 provide for some relative movement of the starter blade 220 in an advancing direction before the separator blade is retracted. Thus the starter blade 220 and separator blade 221 alternately move into and out of the tracks 141—142 so as to advance the blanks 20 one at a time into the notches in the pointer dial 201.

When the starter blade 220 is camming a blank into the notch 203 as viewed in FIG. 17, that edge of the starter blade remote from the blank and the notch 203 gates and retards the series of blanks thereabove. In this way a plurality of blanks 20 may be stored in the track above the pointer and such blanks will be sequentially advanced into the pointer dial in synchronism with the rotation of the pointer dial. It will be observed that in the event the rotation of the pointer dial 201 is interrupted, the feed of the blanks to the pointer dial is interrupted inasmuch as the feed motion is determined by the roller 222 which turns with the pointer dial.

Figure 20:
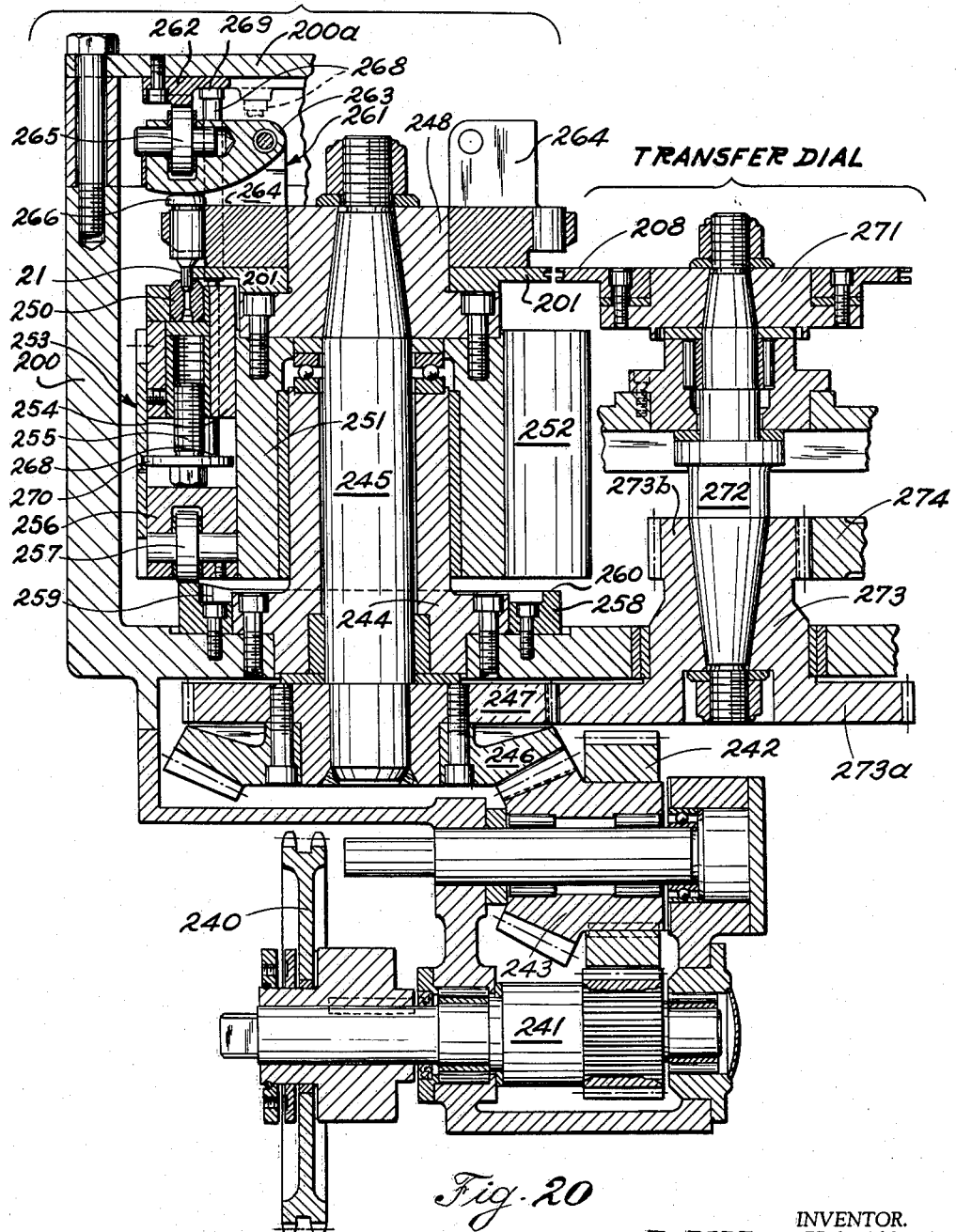
FIG. 20 is a sectional view of the pointer mechanism and the gear drive from the pointer to the transfer dial.
Figure 21:
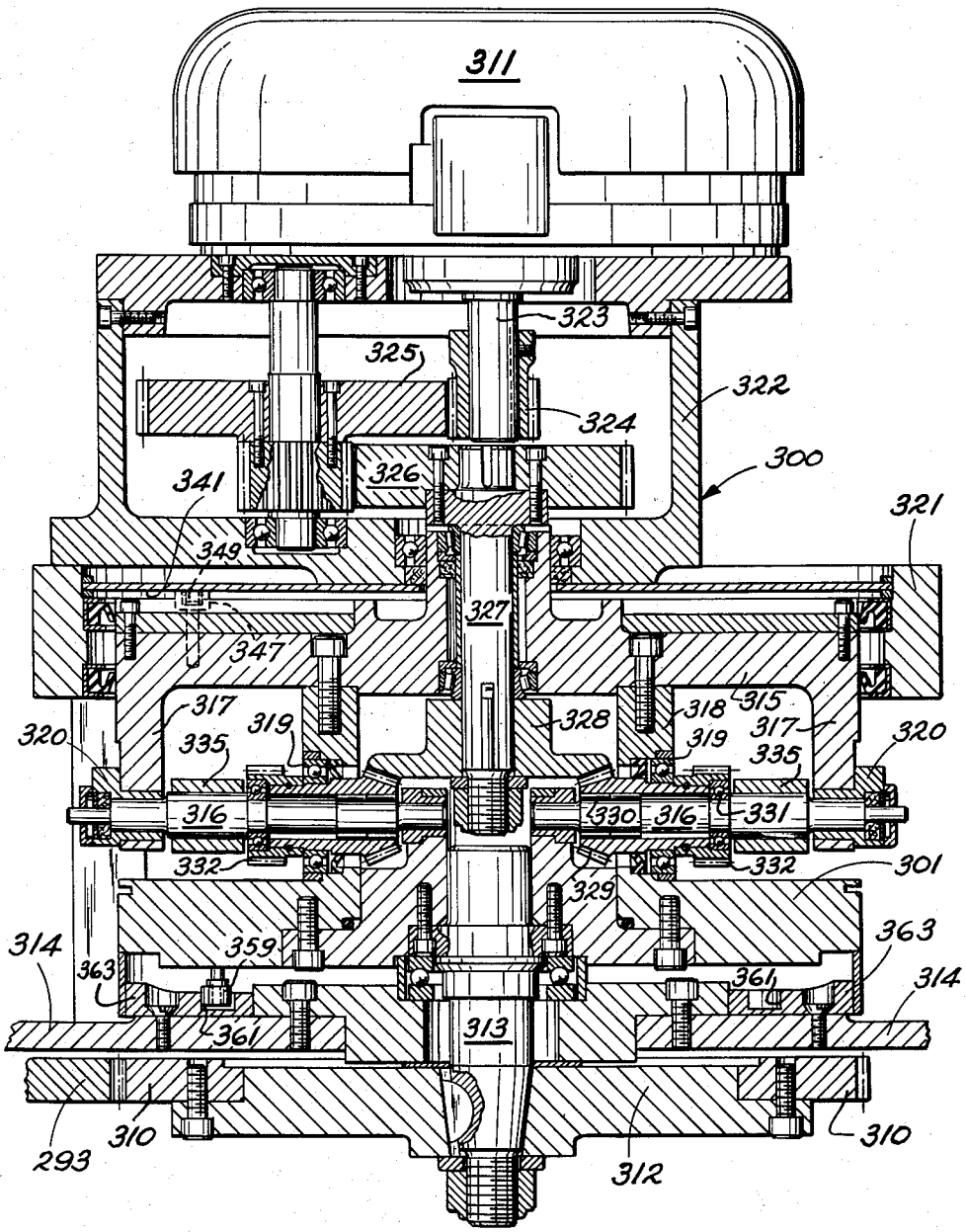
FIG. 21 is a sectional elevation of the slotter showing the drive to the saw arbor.

The drive to the pointer mechanism 200 is by way of chain sprocket 240 driving with the shaft 241, as best shown in FIG. 20. Chain sprocket 240 is driven through chain 13 directly from the flywheel 12 and crankshaft 600. The shaft 241 is provided with a small diameter spur gear driving a larger diameter spur gear 242 fixed to the bevel gear 243. The casing for the pointer 200 is provided with an opening in which is mounted a vertical pedestal 244. A pointer shaft 245 is journalled within the pedestal 244 and has fixed to its lower end a bevel gear 246 which drives the shaft 245 and at the same time the spur gear 247. It will be observed that one gear reduction is obtained between the spur gear on shaft 241 and the spur gear 242 and that a second gear reduction is obtained between the bevel gear 243 and the bevel gear 246 carried by the shaft 245.

The upper end of the shaft 245 is tapered and has fixed thereto a block 248 which carries the pointer dial 201. The pointer housing includes a cover 200a overhanging a portion of the pointer dial and the block 248.

A pointed blank 21 is shown in FIG. 20 during the pointing operation which is effected by a pointer die 250 which is carried in an annular member 251 secured to the head 248. The annular member 251 is provided with a vertically disposed cylindrical bore 252 beneath each of the four notches in the pointer dial, namely, the notches 203—204—205—206. Said cylindrical openings 252 each carry the reciprocating pointer die mechanism indicated in its entirety as at 253. Generally speaking, the pointing operation is accomplished by holding the blank 21 against upward movement while the pointer die 250 is moved upwardly. The die 250 includes a tapered opening so that the pressure operation on a blank provides the desired point on the tip of the shank of the blank. It will be understood that the nature of the point provided and the opening in die 250 may vary depending on the type of blank being made.

The die 250 is carried in a die block 254 which is provided with an adjusting screw 255 bearing against the top of a roller carriage 256 provided with a roller 257 at its bottom. As the pointer assembly 253 is carried around by means of the shaft 245, the rollers 257 ride around on a cam track 258. The cam track has a high area 259 and a low area 260. The high area 259 moves the die assembly, including the block 254 and the die 250, upwardly to point the blank while the blank is being restrained against upward motion by means of the hold-down assembly 261.

The hold-down assembly is positioned by means of a cam track 262 carried by the cover plate 200a. A roller carriage 263 is pivotally carried by a bracket 264 secured to 248 and a roller 265 at the upper side of the carriage maintains the underside of the carriage 263 against the head of the plunger 266. It will be understood that the hold-down assembly 261 is carried by the pointer above each of the notches in the pointer dial and that only one of the four pointer guide assembly, and hold-down assemblies has been shown and described in detail. It will be understood that the high point 259 of the cam track occurs only through a limited portion of the rotation of the pointer assembly and that there is no pressure on either end of the blank when the blank approaches the transfer dial 208.

To insure the retraction or lowering of the pointer die assembly, a vertically disposed pin 268 has a head portion bearing against a track 269 carried by the cover pointer 200a. The low portion of the track 269 is shown in FIG. 20 so as to accommodate the upward thrust of the die assembly imparted thereto by the high point 259 of the cam 258. After the assembly has moved beyond the die pointing station, a high portion of the cam track 269 (as shown in phantom outline) is presented to the head of the pin 268 and thus the pin is thrust downwardly against a washer 270 carried by the pin 255. In this way the entire die pointing assembly is moved downward by means of the cam track 269 and the pin 268.

The transfer dial 208 is secured by means of a disc 271 to the upper end of a transfer dial shaft 272. The lower end of the transfer dial shaft 272 has fixed thereto a composite gear 273 having one gear 273a which is in mesh with the gear 247. The gear 273a is of the same diameter as the gear 247 and the notches in the transfer dial 208 are synchronized with the notches in the dial 201. The composite gear 273 includes gear 273b which meshes with an idler gear 274 which rotates the composite gear 290 on the deburring shaft 291.

The composite gear 290 has a small gear 292 which meshes with the idler gear 274 and a larger gear 293 which meshes with the gear 310 to rotate the slotter dial 301. To review the drive mechanism for pointer, transfer, slotter and deburr mechanism it will be noted that the horizontal shaft 241 is chain driven and this rotation is through bevel gears 243—246 to the pointer. The drive is thence from gear 247 on the pointer to 273a on the transfer dial shaft. The drive is thence from 273b to 247 and from the idler 247 to gear 292 on the deburr shaft 291. The rotation of gear 293 on the deburr shaft is transmitted to the large gear 310 on the slotter shaft. This drive from the pointer to the slotter may be observed in FIGS. 20, 21 and 26.

Referring to FIG. 15 it will be observed that the notch 275 of the transfer dial is approaching the juncture between the transfer dial 208 and the pointer dial 201. The dials are grooved about their periphery and blanks may be cammed off from one dial and into another by fixed pointed members that ride in the grooves. The pointed blank carried in the notch 205 is cammed out of the pointer dial notch 205 and into the transfer dial notch 275 by pointed member 279. The periphery of each of the dials is grooved to a depth substantially half the diameter of the blank. This will be observed in FIGS. 15, 15c, 20, 21 and 26. The pointed member 279 is arranged at the juncture between the two dials 201 and 208 so that the point enters the groove in the periphery of the dial 201 and cams a blank from the notch 205 into the notch 275. The member 279 extends in curved concentric relationship as at 280 with the periphery of the transfer dial and thus holds the blanks in their notches in the transfer dial as they move from the pointer dial to the slotter dial. The curved edge 279a (FIG. 15c) is concentric with periphery of dial 209 and is spaced therefrom about one half the diameter of the blank to hold the blank 21 in the notch 208. The edge of member 201a is also concentric with the periphery of dial 201 and is spaced therefrom to hold the blank 21 in the notch 205. The edge 279b merges in the point and rides in the bottom of the groove in the dial 201.

A similar pointed member 281 is arranged at the juncture between the transfer dial 208 and the slotter dial 301. The slotter dial 301 is provided with eight notches as illustrated in FIG. 15 and is synchronized so that one of the eight notches is presented to a notch on the transfer dial as the dials are rotated. For example, the notch 304 in the slotter dial is approaching the juncture between the transfer dial and the slotter dial so that a blank carried by notch 277 in the transfer dial is cammed off of the transfer dial by the member 281 and into the notch 304 of the slotter dial. Similarly as the dials continue to rotate in the directions indicated, a blank carried in notch 278 of the transfer dial is cammed into the notch 305 of the slotter dial. Thus seven blanks are being carried around the slotter dial while three blanks are being carried around the pointer dial 201.

The slotter mechanism indicated in its entirety as at 300 includes a saw motor 311 at the top of the slotter and a drive for the slotter dial, including the gear 310 at the bottom of the slotter mechanism. The gear 310 is carried by a disc 312 which is keyed to a shaft 313 journalled in the slotter housing 314. Slotter dial 301, along with a circular housing member 315, forms a rotating housing for the saw drive shafts 316. The member 315 is provided with eight depending hangers 317 spaced about its periphery. The slotter dial 301 is provided with an integrally formed vertically disposed annular portion 318 and said annular portion is apertured opposite each of the eight depending hangers 317 to receive the bearings 319 for the eight saw drive shafts 316. The outer end of each of the shafts 316 project through and are non-rotatably supported in apertured bushings 320 in the members 317.

The slotter housing includes a fixed portion 321 which surrounds the periphery of the member 315 and which supports the gear case 322 for the gear drive to the saws. The gear drive for the eight saws includes the motor shaft 323 provided with pinion 324, gear 325 and gear 326 secured to the upper end of the shaft 327. The lower end of the shaft 327 has fixed thereto a bevel gear 328 which meshes with the bevel gears 329.

The inner end of the composite bevel gear 329 is journalled by means of needle bearings 330 on the shaft 316 and the outer end of the composite gear 329 is provided with a ball bearing 331 on shaft 316. The exterior of the outer end of the gear 329 is provided with teeth 332 which mesh with gear 333 on the saw arbor shaft 334.

As shown in FIGS. 22 and 23 the saw arbor support 335 is mounted to rock upwardly and downwardly about the axis of the shaft 316. The saw arbor shaft 334 is mounted in the saw arbor support in ball bearings 336 and 337 and the outer end of the arbor shaft 334 has fixed thereto the circular saw blade 338. Each of the saws 338 is carried by its arbor in a position over one of the eight notches in the slotter dial. The up and down rocking motion of the saw arbor is controlled by a cam 340 which is characterized by a high track portion 341 and a lowering track portion 342 as shown in FIG. 22. The saw arbor is normally urged upwardly by a spring assembly unit 343 which bears against the lower jaw 344 of a member 345 embracing the saw arbor support.

A plunger 347 extends downwardly through the member 315 above each saw arbor and the lower end, as at 348, bears against the upper jaw 346 of the member 345. The roller 349 carried by the plunger 347 is gradually lowered as it rides down the slope of the track 342 and it overcomes the spring assembly unit 343 and forces the saw downwardly so as to saw a slot in the head of a blank 21 carried in a notch of the slotter dial.

Inasmuch as there are eight slotting stations in the dial of the slotter, the major portion of one revolution of the slotter dial may be utilized for the sawing operation. This means that the major portion of one rotation of the slotter dial may have the lowering cam track 342 in engagement with the roller 349. It will be understood that the transmission from the high point of the cam track 241 to the lower area 342 is a gradual change so that the saw reaches the bottom of its sawing depth when the blank reaches the point of discharge from the slotter and is moved into the deburring station. Unslotted blanks 21 are fed into the slotter dial from the transfer dial and slotted blanks 22 are discharged from the slotter into the deburring station.

Figure 24:
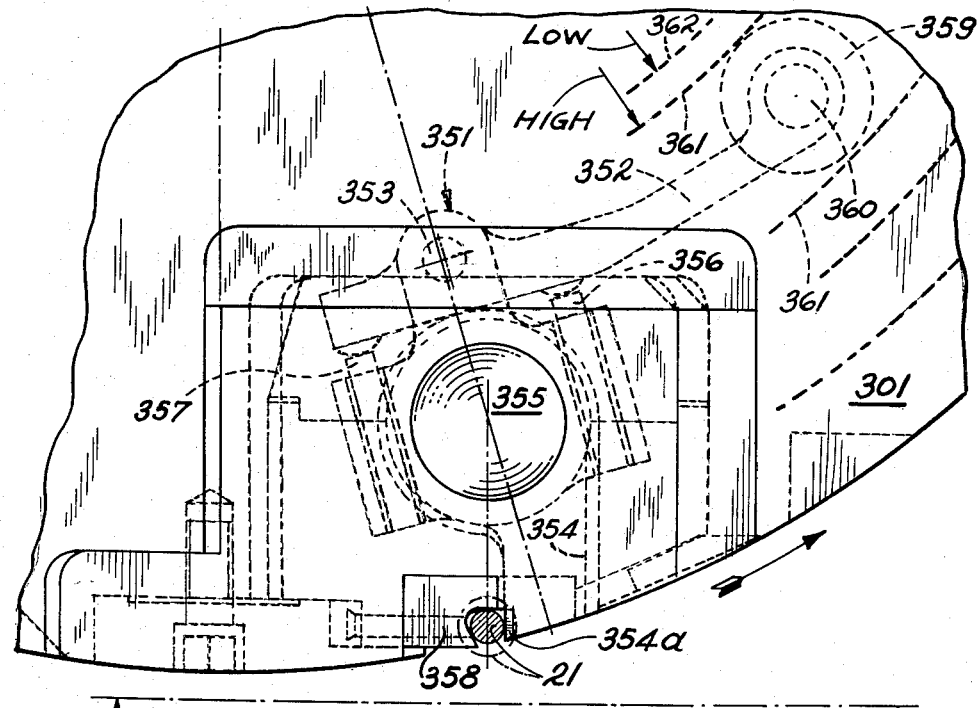
FIG. 24 is a plan view of one of the slotting stations in the slotter dial showing the grip mechanism to hold the shank of the blank while it is being slotted.
Figure 25:
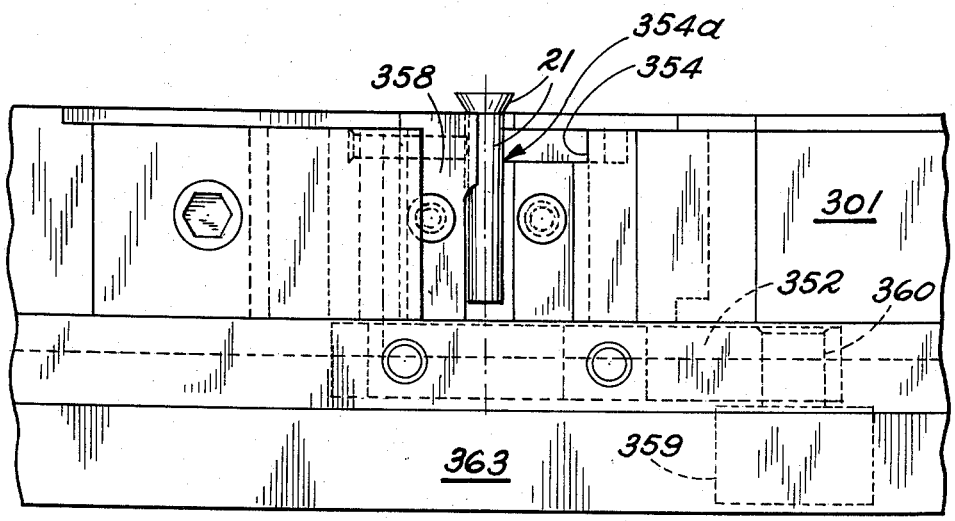
FIG. 25 is an elevation taken on the plane indicated at 25—25 of FIG. 24.
Figure 26:
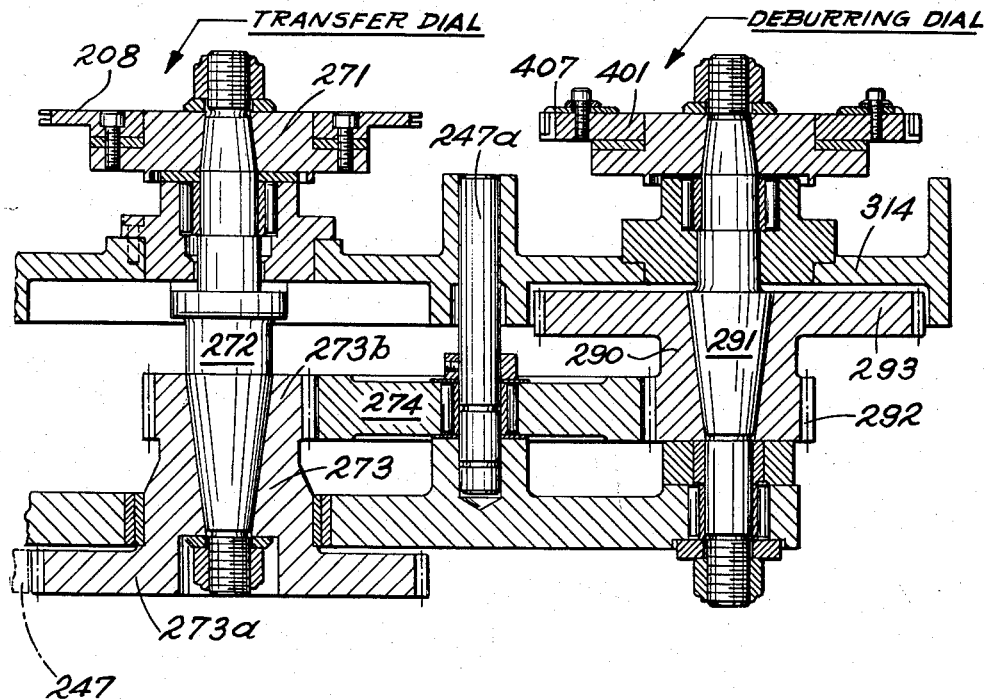
FIG. 26 is a sectional elevation through the transfer dial and the deburring dial showing the gear drive from the transfer dial to the deburring dial.
Figure 34:
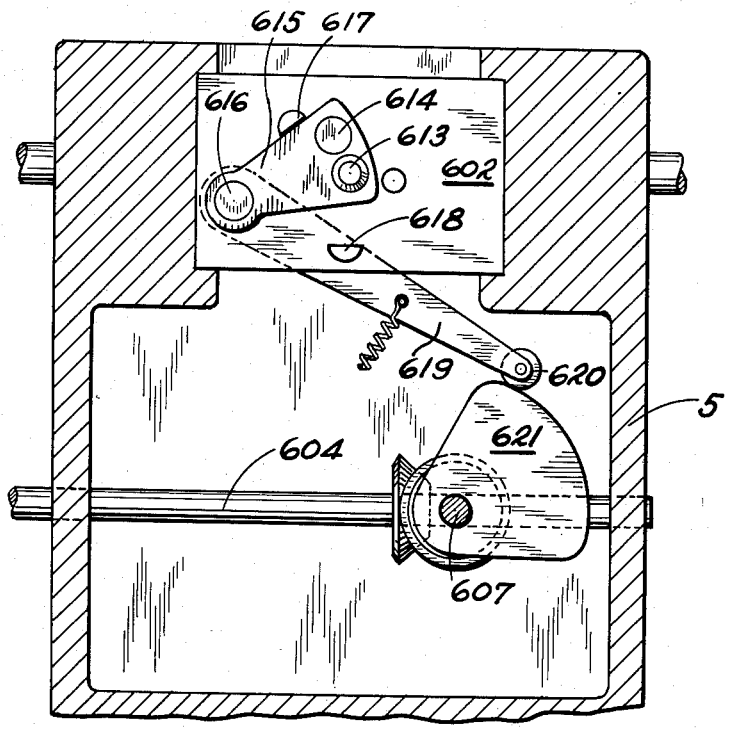
FIG. 34 is a transverse sectional view showing the mechanism for oscillating the punches on the header slide.

In order to grip the blanks 21 securely in the notches of the slotter dial 301 during the sawing, the mechanism best illustrated in FIGS. 24 and 25 is employed. A rocking lever assembly indicated in its entirety as at 351 includes an arm 352 pivoted as at 353 to an arm 354 which is journalled as at 355 on an axis normal to the slotter dial 301. Adjusting screws 356 and 357 are carried on opposite sides of the journal 355 and their outer ends bear against raised portions on the member 352 disposed at each side of the pivot 353. The adjusting screws 356—357 permit an adjustment of the angular relation between the arm 352 and the arm 354 of the gripping assembly 351. The extreme outer end portion of the member 354 swings through a limited arc about the journal 355. When the member 354 is swung in a clockwise direction as viewed in FIG. 24, the left-hand edge portion 354a of the extreme outer end swings into the notch in the slotter dial and there engages and grips a blank 21 received by the slotter dial. When the member 354 is swung in a counterclockwise direction as viewed in FIG. 24, the gripping portion of said member swings out of the notch and therefore permits easy feed into the slotter dial and frees the blank for discharge from the slotter dial into the deburring station. The blank gripping assembly includes a hardened jaw member 358 which is secured in the vertical edge of the slotter dial 301 as shown in FIG. 25.

To effect the rocking movement of the gripping assembly 351 in the slotter dial, a roller 359 is journalled as at 360 on the outer end of the arm 352. This roller 359 depends from the arm 352 and rides in a cam track having side walls 361 in certain areas and side walls 362 in other areas. As shown in FIG. 24, the cam track side walls 361 have caused the roller and the gripping assembly 351 to move to a blank-gripping position. When, however, the roller enters track portions 362, the arm 352 is swung in a counter-clockwise direction and releases the grip on the blank. The cam track having walls 361 and 362 is formed in a circular plate 363 fixed to the bed frame beneath the rotating slotter dial 301. It will be understood that the major portion of the cam track guiding the roller 359 holds the blank gripped between the point at which the blanks 21 are received and the point at which slotted blanks 22 are discharged.

As a slotted blank reaches the deburring dial 401, the blank gripping mechanism in the slotter is moved to release position and the slotted blank is cammed out of the slotter dial at the station indicated at 301 in FIG. 15. It is cammed out of the slotter dial 301 by means of a point 410a on the section 410 projecting into the horizontal slot in the edge of the slotter dial. The transfer of the slotted blank to the deburr dial 401 is like that shown in detail in FIG 15c. As the blank is carried by a notch in the deburring dial 401 around to the blank track 501—502, it is rotated on its vertical axis by engagement with the knurled section 410. The rotation of the blank against the cutter 407 is effected to debur the blank so that a deburred blank 23 enters the track 501—502 leading to the roll threader 500.

The roll threader is located above the crankshaft for the machine and above the header slide but is in an area lower than the deburring dial so that the blanks are urged by gravity downwardly along the tracks 501—502 to the roll threader. The blanks 23 being cammed off the deburring dial 401 are being fed along the track 501—502. The drive mechanism for the roll threader includes a rocking lever 503 pivoted to a bracket 504 on the bed frame intermediate its ends as at 506. The lower end of the rocking lever 503 is pivoted to a pitman 507 journalled eccentrically to the half-speed gear 508. The upper end of the rocking lever 503 is pivoted to a link 509 which in turn is pivoted as at 510 in a reciprocating member 511 which is guided in ways formed in the bed frame as at 512. This drive for the roll threader provides flexibility of roll threader stroke since such stroke is determined only by the excentricity of the linkage connection to the half-speed gear 508 and the proportions of the linkage members. In the embodiment illustrated in the drawings, the linkage operates the roll threader through a greater stroke than the header slide.

The reciprocating member 511 has fixed thereto, as shown in FIG. 28, a roll threading die 513. A cooperating roll threading die 514 is fixed to the bed frame opposite the die 513 so that as blanks are fed into the space between the reciprocating die 513 and the fixed die 514, threads are rolled on the shank of the blank. The tracks 501 and 502 lead the unthreaded blanks 23 down to a feeding mechanism arranged to operate so as to feed the blanks 23 into the space between the fixed die 514 and the reciprocating die 513.

The feed mechanism for the roll threader is indicated in its entirety as at 515 and functions to alternately gate blanks 23 and feed blanks 23 into the roll threader in the manner illustrated in FIGS. 30 and 31.

The drive mechanism for the blank feed to the roll threader is derived as illustrated in FIG. 31a. An arm 516 is pivoted to the bed frame 5 so as to overhang a half-speed shaft 604 having an eccentric 518 fixed thereto. The half-speed shaft 604 is continuously rotated at one-half the speed of the main crankshaft of the machine. The arm 516 is provided with a cam follower 519 and pivoted to the outer end of the arm 516 as at 520 is a vertically reciprocating member 521 which slides through a bracket 522 carried by the bed frame 5. The bracket includes an upstanding portion 523 which pivotally mounts a bell crank 524 as at 526. A coil spring 527 surrounds the rod 521 and is mounted on the rod 521 so as to urge the cam follower 519 against the cam 518. The bell crank 524 includes an arm 528 which extends upwardly from the pivotal mounting 526 and rocks the arm 528 so that the outer end thereof swings in a generally horizontal direction.

The upper end of the arm 528 is provided with a pivot 529 which connects a link 530 to the thread roller feed mechanism indicated in its entirety as at 515. The feed mechanism is mounted on the bed frame 5 by means of a bracket 531. The bracket 531 is provided with an upwardly extending side wall 532, a top cap member 533 and a lower cap member 534. The principal components of the roller feed mechanism includes a main pusher 535 and a secondary or gating pusher 536. Both of the pushers are mounted for reciprocation in the bracket 532. The main pusher 535 comprises a rectangular plate which reciprocates in the path between the two thread rolling dies 513—514, and its advancing movement in this path is timed with respect to the motion of the die 513 with respect to the fixed die 514.

A bar 540 is pivoted as at 541 to the link 530 and is guided for reciprocation by means of the members 533 and 534 best shown in FIG. 31b. The main pusher 535 is secured to the bar 540 and reciprocates therewith. It is offset with respect to the bar 540 and extends forwardly therefrom into the space between the thread rolling dies.

The arrangement of the main pusher and its oscillating driving lever 528 is such that the main pusher bears against one side of the shank of the blank 23 which is to be threaded and moves in the same direction as the roll threading die 513 so that the blank is maintained vertical as the threads are being rolled thereon. As indicated in FIG. 30, the main pusher 535 gates the blanks in the track 501—502 while the thread is being rolled on a preceding blank. The secondary pusher 536 does not enter into the path between the roll threading dies but merely oscillates transversely of the track 501—502 as determined by the rocking motion of a lever 538 pivoted as at 539.

The upper end of the lever 538 is slotted to accommodate a pin 536a carried by the secondary pusher 536. A coil spring 541 is wrapped about the pivot 539 and anchored to the lever 538 so as to normally bias the lever about its pivot in a counter-clockwise direction. The result of the spring mounting is that the secondary pusher 536 is normally biased into the blank track 501—502 as indicated in FIG. 31.

The lower end of the rocking lever 538 is operatively connected as at 542 to a reciprocating bar 543 slidably mounted in the supporting bracket 532. The end of the bar 543 remote from its connection to the lever 538 bears against the end of an adjusting screw 544 carried by bracket 545 on the rocking lever 528.

The arrangement of pushers 535 and 536 is such that the pusher 535 is directly advanced to the left as viewed in FIGS. 28 to 31 by a counter-clockwise swinging of the lever 528. This same counter-clockwise swinging of the lever 528 results in a retracting motion being imparted to the secondary pusher 536 and thus the pushers alternately gate the blanks at the end of the track 501—502 and the main pusher serves the additional function of advancing the blank 23 into the path between the roll threading dies.

The bed frame 5 is provided with a main crankshaft 600 to which is secured the fly wheel 12. The crankshaft 600 is mounted transversely of the bed frame as illustrated in FIG. 32 and is provided with a pitman 601 connected to a reciprocating header slide 602. For each rotation of the crankshaft 600 the header slide makes one complete reciprocation toward and away from a die breast 603. The half-speed shaft 604 is also journalled transversely of the bed frame 5 and is provided at the outer right-hand side of the bed frame with a half-speed gear 508. The gear 508 is driven by a gear 605 mounted on the crankshaft 600 between the fly wheel and the side wall of the bed frame (see FIG. 27). This arrangement provides that the shaft 604 turns at one-half of the speed of the crankshaft 600 and accordingly the bevel gear 606 on the shaft 604 drives the longitudinally mounted shaft 607 at half-speed through bevel gear 608. The shaft 607 extends forwardly of the die breast and is provided with another bevel gear 609 meshing with a gear 610 to drive the knockout shaft 611 journalled transversely of the frame near the die breast.

The die breast 603 is provided with a die indicated at 612 and two pressure operations are performed upon a blank in the die 612 by the punches 613 and 614 carried by the punch holder 615 fitted on the header slide as at 669. It will be noted from FIG. 34 that the punch holder 615 may be rocked to two positions; the raised position where it bears against the stop 617 and its lower position where it bears against stop 618. When the punch holder is raised, the punch 613 strikes the blank held in the die 612 and when the punch holder is lowered, the punch 614 strikes the blank held in the die 612. The rocking motion of the punch holder is accomplished by rocking the shaft 616 by means of a crank arm 619 keyed for sliding movement on shaft 616 and provided with a cam follower 620 which rides on cam 621 fixed to the shaft 607.

It will be observed that as the header slide reciprocates it carries with it the shaft 616 and regardless of the longitudinal position of the header slide 602, the position of the punch holder is determined by the cam 621. Since the cam 621 is rotated at half the speed of the main crankshaft 600, one punch 613 will be presented to the die 612 on one reciprocation of the header slide and the other punch 614 will be presented to the die 612 on the next succeeding reciprocation of the header slide 602.

Three stations C, D and E are indicated on the die breast (FIGS. 32 and 35–39). Station C is the station where the stock 7 is fed through the die breast into the shear. Station D is in alignment with a knockout which pushes a cut blank out of the shear and into the transfer. Station E is at the die 612 where the blank is worked.

The knockout shaft 611 is provided with cam means 622 arranged to bear against the lower ends of knockout levers 623 and 624. The knockout lever 623 actuates the knockout 625 which is operated to push a cut blank out of the shear mechanism into the transfer mechanism at station D so that the cut blank may be transferred to the die 612 at station E. The knockout lever 624 actuates the knockout 626 which ejects a finished blank from the die 612 so that the ejected blank falls down into the space between the header slide and the die breast and into the trough 8 leading to the elevator 100. The heavy spring 623a overcomes the bias of spring 625a as controlled by the cam means 622.

The shearing and transfer mechanism for the cut blank includes a shear 630 and a transfer 631, both journalled on the same pin 632 normal to the die breast 603. The shear 630 and the transfer 631 are actuated by cams 633 and 634, respectively. The cams as illustrated in FIGS. 35–39 are fixed to the shaft 607 extending longitudinally of the bed frame beneath the die breast. To facilitate the high-speed operation of the machine, the shear is constructed and arranged to move from station C where the stock 7 enters the machine to an intermediate station D where the cut blank is pushed out of the shear. The transfer is constructed and arranged to move from the station D the point where the cut blank is pushed out of the shear into the transfer and carried to the die 612 in the bed frame at station E.

The advantage of this arrangement is that the shear, which is relatively heavy, is moved but a short distance and the transfer mechanism is moved independently of the shear. Heretofore the shearing and transferring of the cut blank has usually involved the transferring of the blank by the shear mechanism which was then required to travel through the arc from the line on which the rod stock enters the bed frame to the die in which the blank is worked. In some prior art machines the blank was pushed out of the shear into a holding die in the die breast and then into a transfer.

Referring to FIGS. 35, 38 and 39, the line at which the rod stock 7 enters the bed frame is indicated at C. The stock is fed into a quill-type shear opening while the shear dwells at station C. The station where the cut blank is moved out of the shear into the transfer is indicated at D and the station where the blank is worked in the bed frame die is indicated as at E. The station E corresponds to the die 612 in the die breast where the blank is twice worked by header slide tools 613 and 614.

The shear and its two positions are illustrated in FIG. 38 wherein the shear includes a bellcrank 635 having a roller 636 arranged to follow the cam 633. The shear 630 and its bellcrank 635 are biased into engagement with the cam 633 by means of spring 637 and spring rod 638.

The transfer assembly 631 includes spring pressed transfer fingers 639 and 640 which are shaped to receive the cut blanks between their outer free ends. The transfer arm 631 is urged in a clockwise direction by spring 641 and spring rod 642 so that the cam follower 643 for the transfer is biased against the surface of cam 634. FIG. 35 illustrates the shear and the transfer as mounted on the same shaft 632 whereas in FIG. 38 the transfer is omitted for clarity. In FIG. 39 the transfer and its motion is illustrated and the shear is omitted for clarity.

The cams 633 and 634 are so contoured and are fixed to the shaft 607 so that the shear 630 and transfer 631 move in timed relation to each other and the header slide. For example, when the shear is in the dotted line position 630a of FIG. 38, the transfer is moving toward its first position as at 631b. Rotation of the shaft 607 positions both the shear and the transfer at station D. The movement of the shear from C to D cuts off a blank from the rod stock and when the shear and transfer both reach station D, the knockout 626 is advanced to push the blank out of the shear and into the transfer fingers 639 and 640. The shear 630 and the transfer 631 both dwell at station D and during this dwell period the cut blank is removed from the shear by the knockout and is received by the transfer fingers 639—640. Thereafter, during further rotation of shaft 607, the transfer is moved from station D to station E. This is the full line position of FIG. 39. Thereafter during further rotation of the shear cam, the shear is moved in a counter-clockwise direction from station D back to station C. There is a dwell of the transfer at station E during which dwell period the header slide tool engages the cut blank held in the transfer and pushes the said blank into the bed frame die 612. Thereafter upon rotation of shaft 607, the transfer is moved counter-clockwise from station E back to station D. When the shear has returned to station C there is a dwell of the shear during which time the stock is advanced into the shear by the feed rolls. The timing as controlled by the shear and transfer cams is such that the cut blank gets to station D before the transfer fingers get to D and thus the blank is held in the shear as the transfer fingers snap over the blank. Then during dwell of both shear and transfer at D, the blank is pushed out of the shear. Thus the blank is guided by the transfer fingers as the blank is freed of the shear.

The transfer 631 is provided with an arcuate slot 631a which coincides with the path of the blank from station C to station E. The slot 631a permits the stock 7 advanced by the feed rolls to abut a stock gauge 7a (FIG. 32). The stock 7 may be pushed through the shear quill and against the stock gauge 7a while the transfer is at station E.

Although stove bolts, and the like, require the slotting of the head as herein described, I am aware that a number of useful headed fasteners may be made without slotting the head and accordingly the apparatus of the present invention is well suited for the heading, pointing and roll threading without the slotting and deburring. Accordingly, in FIGS. 40 and 41 a form of my invention is illustrated wherein the blanks after pointing are cammed from the pointer dial directly into a track leading to the roll threader.

In this embodiment of the invention the headed blanks 20 are elevated in the usual manner from the header and are guided down the tracks 141—142 to the pointer. The pointer dial rotates as indicated by arrow 700 in FIG. 41. The blanks 20 are fed into the dial by the pointer feed mechanism 202 and as the blanks 20 are carried in a counter-clockwise direction around the dial they are pointed as heretofore described. The blanks are retained in the notches in the pointer dial by a circular guard member 704 which merges into the track 702 leading down to the roll threader mechanism.

As a pointed blank 21 carried by notch 205 approaches the pointed member 703, the blank is cammed out of the dial and into the track formed by rails 701—702. The blanks slide down the tracks 701—702 by gravity and at the roll threader mechanism the blanks are fed into the roll thread dies 513—514.

Although I have shown and described two forms of my invention in considerable detail, it will be appreciated by those skilled in the art that numerous modifications may be made therein without departing from the scope of the invention as defined in the following claims.

What is claimed is:

1. A machine for making bolts comprising a bed frame, a die in the bed frame, a reciprocating header slide in the bed frame, means to eject a blank from the die after two header slide strokes, a roll threader mounted on the bed frame, a pointer mounted on the bed frame, said pointer comprising a rotary dial having a plurality of forging dies spaced around its periphery, said forging dies bzeing adaptable to forge a point on a blank therein, cam means on said bed frame adaptable to operate said forging dies during a portion of the revolution of said dial, means to rotate said dial in timed relationship with the reciprocation of said header slide, means to feed blanks ejected from said die to said pointer in substantially the same sequence in which the blanks are ejected from said die, and means to conduct pointed blanks from the pointer to the roll threader and roll threads thereon in the same sequence.

2. A machine for making bolts comprising a bed frame, a die in the bed frame, a reciprocating header slide in the bed frame, means to eject a headed blank from the die after the blank is headed by two blows of the header slide, a pointer mounted above said header slide, means to elevate ejected blanks to said pointer, means to feed blanks to the pointer in substantially the same sequence in which they are headed, said pointer comprising a dial mounted for rotation about a vertical axis, a plurality of work stations around the periphery of said dial, each of said work stations including a vertically reciprocating pointing die having a conical opening to point the shank of a blank, each of said work stations including a vertically disposed member having an end face bearing against the head of a blank, means to rotate the dial and work stations, and cam means on said bed frame to press the blank axially between said pointing die and said member as the pointer dial is being rotated about said vertical axis.

3. A machine for making bolts comprising a double blow header, a pointer mounted above said double blow header, means to elevate blanks from said header to said pointer, means to feed blanks to the pointer in substantially the same sequence in which they are headed, said pointer comprising a dial mounted for rotation about a vertical axis, a plurality of work stations around the periphery of said dial, each of said work stations including a vertically reciprcating pointing die rotationally fixed relative to said dial having a conical opening to point the shank of a blank, each of said work stations including a vertically disposed member having an end face bearing against the head of a blank, means to rotate the dial and work stations, and means to press the blank axially between said pointing die and said member as the pointer dial is being rotated about said vertical axis movement of said blank into said pointing die flowing metal of said blank forming a point thereon.

4. In a machine for making bolts comprising a bed frame, a heading die in the bed frame, a header slide carrying a shiftable punch holder and mounted in the bed frame for reciprocation toward and away from said heading die, two punches on said punch holder, a crankshaft journalled transversely in the bed frame to reciprocate said header slide, said crankshaft carrying a flywheel, a motor connected to rotate said crankshaft and flywheel, a second shaft supported by said bed frame, driving means connecting said shafts and driving said second shaft at half the speed of said crankshaft, means driven in timed relation to said crankshaft for successively cutting blanks from elongated stock and presenting a cut-off blank to said heading die after every other revolution of said crankshaft, means to shift said punch holder during each revolution of said crankshaft to bring said punches alternately into alignment with said heading die, means driven in timed relation to said crankshaft to eject a headed blank from said heading die after every other revolution of said crankshaft and allow the ejected blank to drop below said heading die, a fixed roll threading die supported by said bed frame, a moving roll threading die slidably supported by said bed frame for reciprocation adjacent said fixed roll threading die, an eccentric on said second shaft, a lever pivotally supported by said bed frame, a link connecting one arm of said lever to said eccentric and a link connecting the other arm of said lever to said moving roll threading die, whereby said moving roll threading die reciprocates at half the frequency of said crankshaft, and means to collect the headed blanks ejected from said heading die from below said heading die and deliver the same to said roll threading dies in substantially the same sequence in which said blanks are headed.

5. A machine according to claim 4 in which the means to collect the headed blanks ejected from said heading die and deliver the same to said roll threading dies includes orienting means to receive the ejected blanks in random orientation from below said heading die and arrange them in substantial parallelism suspended by their heads.

References Cited in the file of this patent

UNITED STATES PATENTS

| | | |
|---|---|---|
| 1,515,187 | Craig | Nov. 11, 1924 |
| 1,629,705 | Holmberg | May 24, 1927 |
| 1,734,752 | Thomas | Nov. 5, 1929 |
| 1,798,920 | Wilcox | Mar. 31, 1931 |
| 1,931,699 | Hubbell | Oct. 24, 1933 |
| 1,953,257 | Peirce | Apr. 3, 1934 |
| 2,013,426 | Simkins et al. | Sept. 3, 1935 |
| 2,020,658 | Frost | Nov. 12, 1935 |
| 2,020,660 | Friedman | Nov. 12, 1935 |
| 2,124,022 | Alberts | July 19, 1938 |
| 2,162,891 | Johnson | June 20, 1939 |
| 2,335,715 | Wallace | Nov. 30, 1943 |
| 2,373,948 | De Vellier | Apr. 17, 1945 |
| 2,521,209 | Fether | Sept. 5, 1950 |
| 2,591,285 | Overly | Apr. 1, 1952 |
| 2,599,053 | Friedman | June 3, 1952 |
| 2,662,597 | Ballard | Dec. 15, 1953 |
| 2,730,731 | Schaeffer | Jan. 17, 1956 |
| 2,820,973 | Farmer | Jan. 28, 1958 |
| 2,890,468 | Arnold | June 16, 1959 |

FOREIGN PATENTS

| | | |
|---|---|---|
| 442,984 | Great Britain | Feb. 18, 1936 |